US012613630B2

(12) United States Patent
Zheng et al.

(10) Patent No.: US 12,613,630 B2
(45) Date of Patent: Apr. 28, 2026

(54) MANAGEMENT OF DATA STAGING FOR WRITING TO OBJECT BASED STORAGE

(71) Applicant: NetApp, Inc., San Jose, CA (US)

(72) Inventors: Qinghua Zheng, Sunnyvale, CA (US); Cheryl Marie Thompson, Sunnyvale, CA (US); Anil Paul Thoppil, Pleasanton, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/644,464

(22) Filed: Apr. 24, 2024

(65) Prior Publication Data

US 2025/0328240 A1      Oct. 23, 2025

Related U.S. Application Data

(60) Provisional application No. 63/635,448, filed on Apr. 17, 2024.

(51) Int. Cl.
G06F 3/06 (2006.01)

(52) U.S. Cl.
CPC .......... G06F 3/0604 (2013.01); G06F 3/0631 (2013.01); G06F 3/0659 (2013.01);
(Continued)

(58) Field of Classification Search
CPC .... G06F 3/0601; G06F 3/0604; G06F 3/0605; G06F 3/0608; G06F 3/061; G06F 3/0611;
(Continued)

(56) References Cited

U.S. PATENT DOCUMENTS

| | | | | |
|---|---|---|---|---|
| 9,274,966 | B1 * | 3/2016 | Chahwan | ............ G06F 12/0866 |
| 12,169,487 | B1 * | 12/2024 | Chaturvedi | .......... G06F 16/221 |

(Continued)

FOREIGN PATENT DOCUMENTS

EP            2270693 A1      1/2011

OTHER PUBLICATIONS

Non-Final Office Action mailed on Apr. 22, 2025 for U.S. Appl. No. 18/644,459, filed Apr. 24, 2024, 42 pages.
(Continued)

*Primary Examiner* — Tracy A Warren
(74) *Attorney, Agent, or Firm* — Jaffery Watson Hamilton & DeSanctis LLP

(57) ABSTRACT

A method, computing device, and non-transitory machine-readable medium for managing incoming/outgoing flow through a staging area. A request to write data to an object based storage is received. A determination is made that the data is to be first staged within a transfer data structure. The transfer data structure is in a first storage tier and the object based storage is in a second storage tier. A determination is made that an amount of storage space used in the transfer data structure exceeds a start throttle threshold. In response to the determination that the amount of storage space exceeds the start throttle threshold, the request is sent into a queue selected from a set of throttling queues, wherein requests in the queue are handled in a first in, first out (FIFO) order. The request in the queue is processed based on the FIFO order and a dynamic throttle rate.

20 Claims, 10 Drawing Sheets

(52) U.S. Cl.
CPC ............ *G06F 3/067* (2013.01); *G06F 3/0656*
(2013.01); *G06F 3/0685* (2013.01)

(58) Field of Classification Search
CPC .... G06F 3/0613; G06F 3/0685; G06F 3/0655;
G06F 3/0656
See application file for complete search history.

(56) References Cited

U.S. PATENT DOCUMENTS

| | | | | |
|---|---|---|---|---|
| 2002/0196799 | A1* | 12/2002 | Remer | H04L 49/901 |
| | | | | 370/443 |
| 2006/0064550 | A1 | 3/2006 | Katsuragi et al. | |
| 2012/0215970 | A1 | 8/2012 | Shats | |
| 2013/0191610 | A1* | 7/2013 | Burka | G06F 12/1054 |
| | | | | 711/206 |
| 2016/0313944 | A1* | 10/2016 | Hodgdon | G06F 3/0652 |
| 2017/0024161 | A1* | 1/2017 | Katiyar | G06F 3/0689 |
| 2017/0199675 | A1 | 7/2017 | Subramanian et al. | |
| 2017/0199678 | A1* | 7/2017 | Subramanian | G06F 3/0685 |
| 2017/0199698 | A1 | 7/2017 | Brewington | |
| 2017/0199707 | A1 | 7/2017 | Varghese et al. | |
| 2018/0052744 | A1* | 2/2018 | Chen | H04L 67/561 |
| 2018/0074725 | A1 | 3/2018 | Subramanian et al. | |
| 2018/0314449 | A1* | 11/2018 | Kondapalli | G06F 3/0631 |
| 2019/0087342 | A1* | 3/2019 | Masuda | G06F 3/0604 |
| 2019/0272123 | A1* | 9/2019 | Gissin | G06F 3/0659 |
| 2021/0026704 | A1* | 1/2021 | Nandagopal | G06F 9/4881 |
| 2021/0240391 | A1* | 8/2021 | Shin | G06F 13/1642 |
| 2022/0300193 | A1 | 9/2022 | Gao et al. | |
| 2022/0317921 | A1* | 10/2022 | Subramanian | G06F 3/0619 |
| 2022/0326878 | A1* | 10/2022 | Paduroiu | G06F 3/0659 |
| 2023/0161504 | A1 | 5/2023 | Nagasaka | |
| 2023/0164078 | A1* | 5/2023 | Li | H04L 47/12 |
| | | | | 370/235 |
| 2023/0266995 | A1* | 8/2023 | Mic | G06F 9/4881 |
| | | | | 712/220 |
| 2025/0328285 | A1 | 10/2025 | Zheng et al. | |

OTHER PUBLICATIONS

Final Office Action mailed on Dec. 5, 2025 for U.S. Appl. No. 18/644,459, filed Apr. 24, 2024, 42 pages.

* cited by examiner

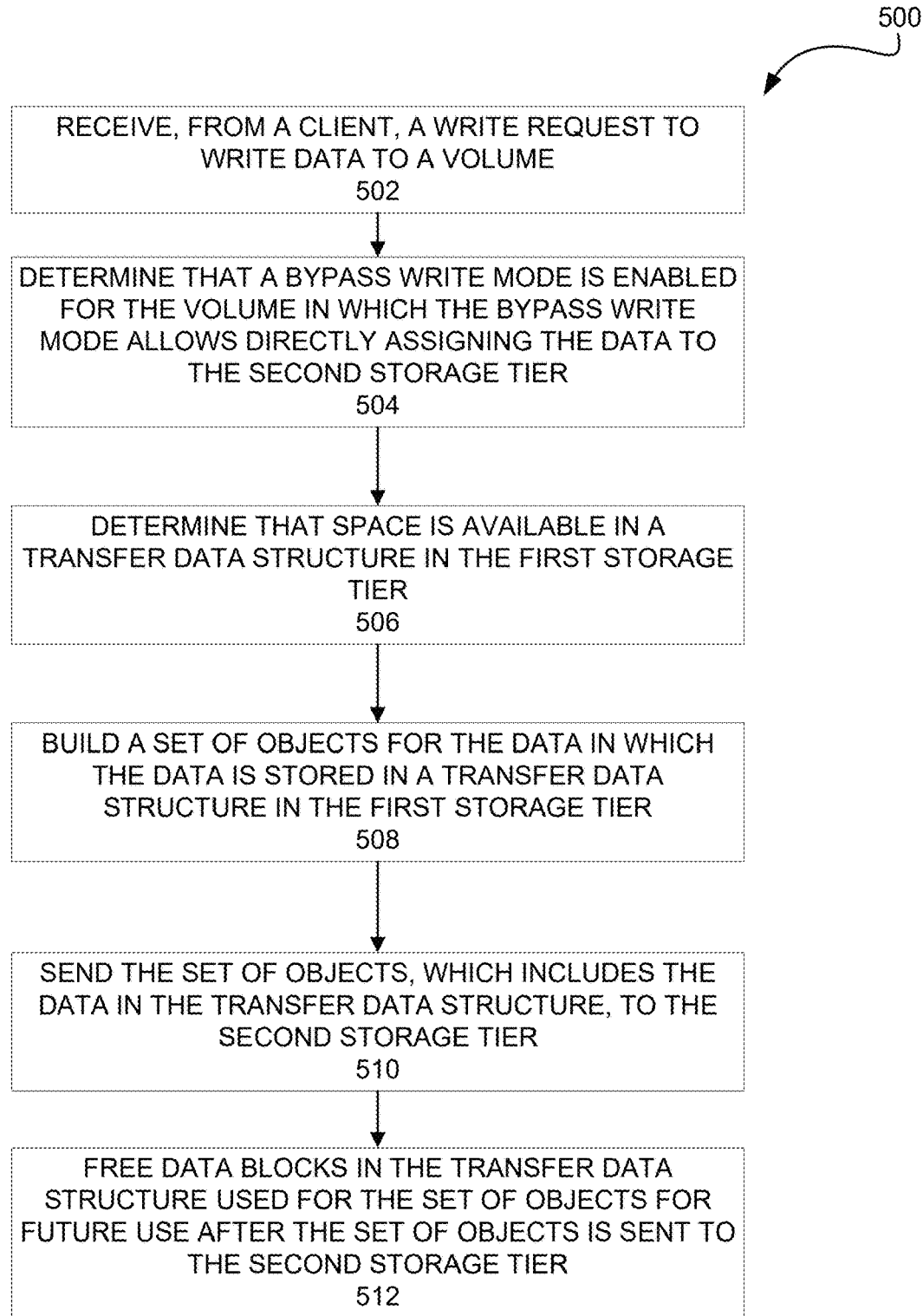

500

RECEIVE, FROM A CLIENT, A WRITE REQUEST TO
WRITE DATA TO A VOLUME
502

DETERMINE THAT A BYPASS WRITE MODE IS ENABLED
FOR THE VOLUME IN WHICH THE BYPASS WRITE
MODE ALLOWS DIRECTLY ASSIGNING THE DATA TO
THE SECOND STORAGE TIER
504

DETERMINE THAT SPACE IS AVAILABLE IN A
TRANSFER DATA STRUCTURE IN THE FIRST STORAGE
TIER
506

BUILD A SET OF OBJECTS FOR THE DATA IN WHICH
THE DATA IS STORED IN A TRANSFER DATA
STRUCTURE IN THE FIRST STORAGE TIER
508

SEND THE SET OF OBJECTS, WHICH INCLUDES THE
DATA IN THE TRANSFER DATA STRUCTURE, TO THE
SECOND STORAGE TIER
510

FREE DATA BLOCKS IN THE TRANSFER DATA
STRUCTURE USED FOR THE SET OF OBJECTS FOR
FUTURE USE AFTER THE SET OF OBJECTS IS SENT TO
THE SECOND STORAGE TIER
512

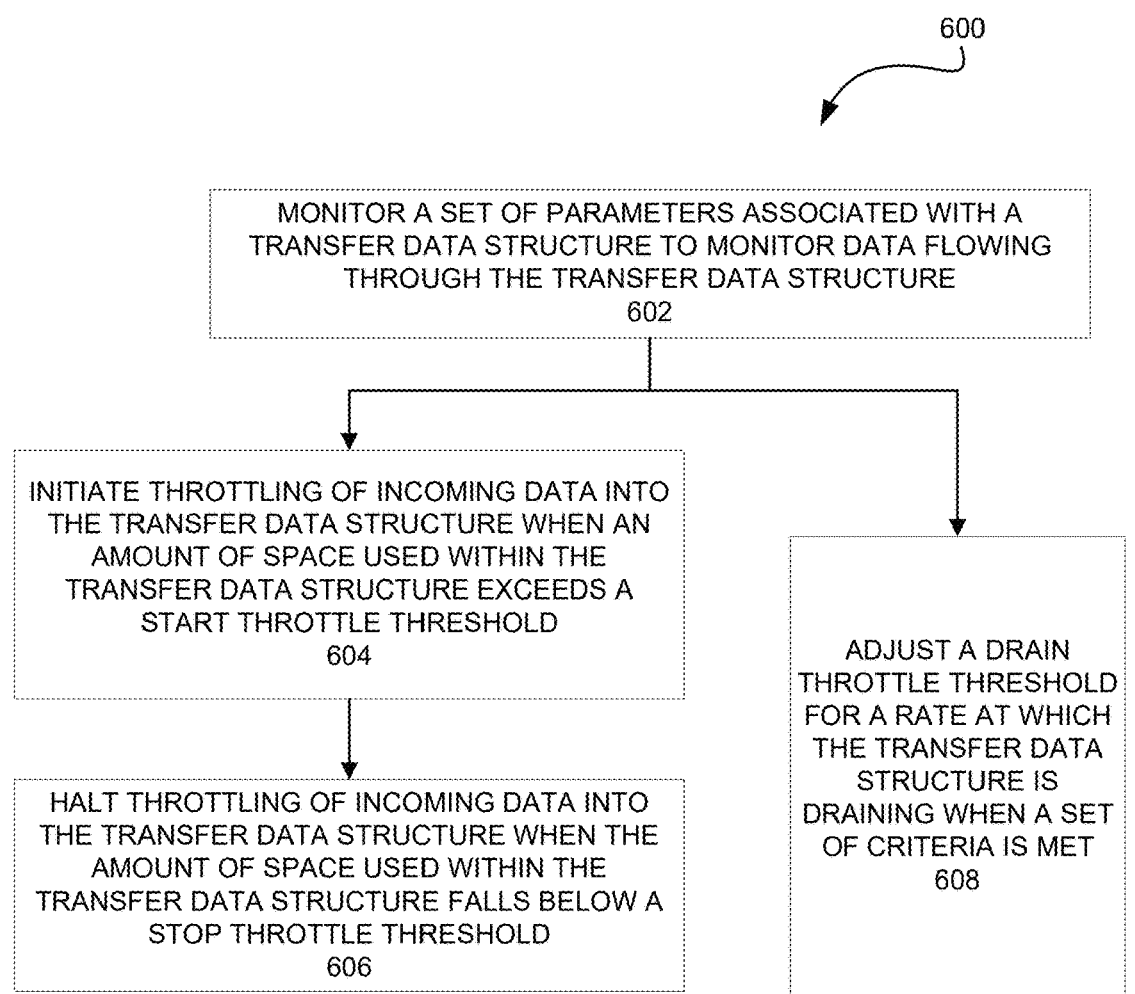

MONITOR A SET OF PARAMETERS ASSOCIATED WITH A TRANSFER DATA STRUCTURE TO MONITOR DATA FLOWING THROUGH THE TRANSFER DATA STRUCTURE
602

INITIATE THROTTLING OF INCOMING DATA INTO THE TRANSFER DATA STRUCTURE WHEN AN AMOUNT OF SPACE USED WITHIN THE TRANSFER DATA STRUCTURE EXCEEDS A START THROTTLE THRESHOLD
604

ADJUST A DRAIN THROTTLE THRESHOLD FOR A RATE AT WHICH THE TRANSFER DATA STRUCTURE IS DRAINING WHEN A SET OF CRITERIA IS MET
608

HALT THROTTLING OF INCOMING DATA INTO THE TRANSFER DATA STRUCTURE WHEN THE AMOUNT OF SPACE USED WITHIN THE TRANSFER DATA STRUCTURE FALLS BELOW A STOP THROTTLE THRESHOLD
606

Fig. 6

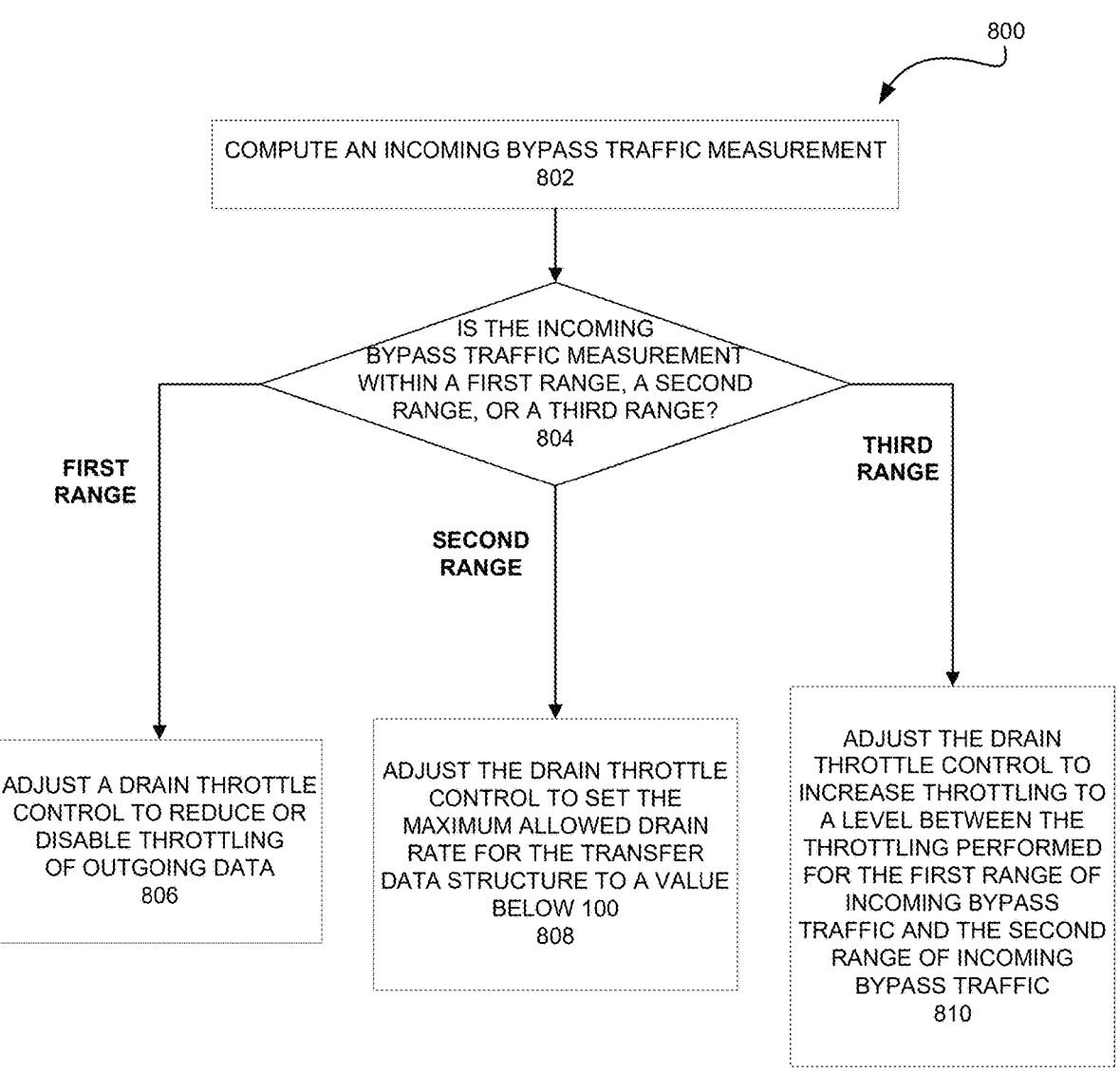

800

COMPUTE AN INCOMING BYPASS TRAFFIC MEASUREMENT
802

IS THE INCOMING
BYPASS TRAFFIC MEASUREMENT
WITHIN A FIRST RANGE, A SECOND
RANGE, OR A THIRD RANGE?
804

FIRST
RANGE

SECOND
RANGE

THIRD
RANGE

ADJUST A DRAIN THROTTLE
CONTROL TO REDUCE OR
DISABLE THROTTLING
OF OUTGOING DATA
806

ADJUST THE DRAIN THROTTLE
CONTROL TO SET THE
MAXIMUM ALLOWED DRAIN
RATE FOR THE TRANSFER
DATA STRUCTURE TO A VALUE
BELOW 100
808

ADJUST THE DRAIN
THROTTLE CONTROL TO
INCREASE THROTTLING TO
A LEVEL BETWEEN THE
THROTTLING PERFORMED
FOR THE FIRST RANGE OF
INCOMING BYPASS
TRAFFIC AND THE SECOND
RANGE OF INCOMING
BYPASS TRAFFIC
810

Fig. 8

MANAGEMENT OF DATA STAGING FOR WRITING TO OBJECT BASED STORAGE

CROSS-REFERENCE TO RELATED APPLICATION

This application is related to and claims the benefit of the priority date of U.S. Provisional Application No. 63/635,448, filed Apr. 17, 2024, entitled "Bypass Mechanism for Writing to Object Based Storage," which is incorporated herein by reference in its entirety.

TECHNICAL FIELD

The present description relates to networked storage environments, and more particularly, to methods and systems for efficiently storing data at object based data stores, (including cloud based data stores).

BACKGROUND

Different types of storage systems are currently used. Examples of such storage systems include, but are not limited to, direct attached storage, network attached storage (NAS) systems, storage area networks (SANs), and others. Storage systems may be used for a variety of purposes, such as, for example, providing multiple users with access to shared data, backing up data, and other related purposes.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. From the perspective of a client computing system each storage volume can appear to be a single storage device. However, each storage volume can represent storage space in one storage device or an aggregate of some or all of the storage space in multiple storage devices. Further, a storage volume may represent a composite aggregate that includes both physical storage and object based storage (e.g., on-premises storage or cloud storage). The embodiments described herein recognize that it may be desirable to have methods and systems that improve the performance and efficiency of how data is written to storage.

BRIEF DESCRIPTION OF THE DRAWINGS

The present disclosure is best understood from the following detailed description when read with the accompanying figures.

FIG. 5 is a flowchart diagram of a process for performing selective write allocation in accordance with one or more embodiments.

FIG. 6 is a flowchart diagram of a process for managing data flowing through a transfer data structure in accordance with one or more embodiments.

FIG. 8 is a flowchart diagram of a process for managing backend throttling for a transfer data structure in accordance with one or more embodiments.

DETAILED DESCRIPTION

I. Overview

Figure 1:
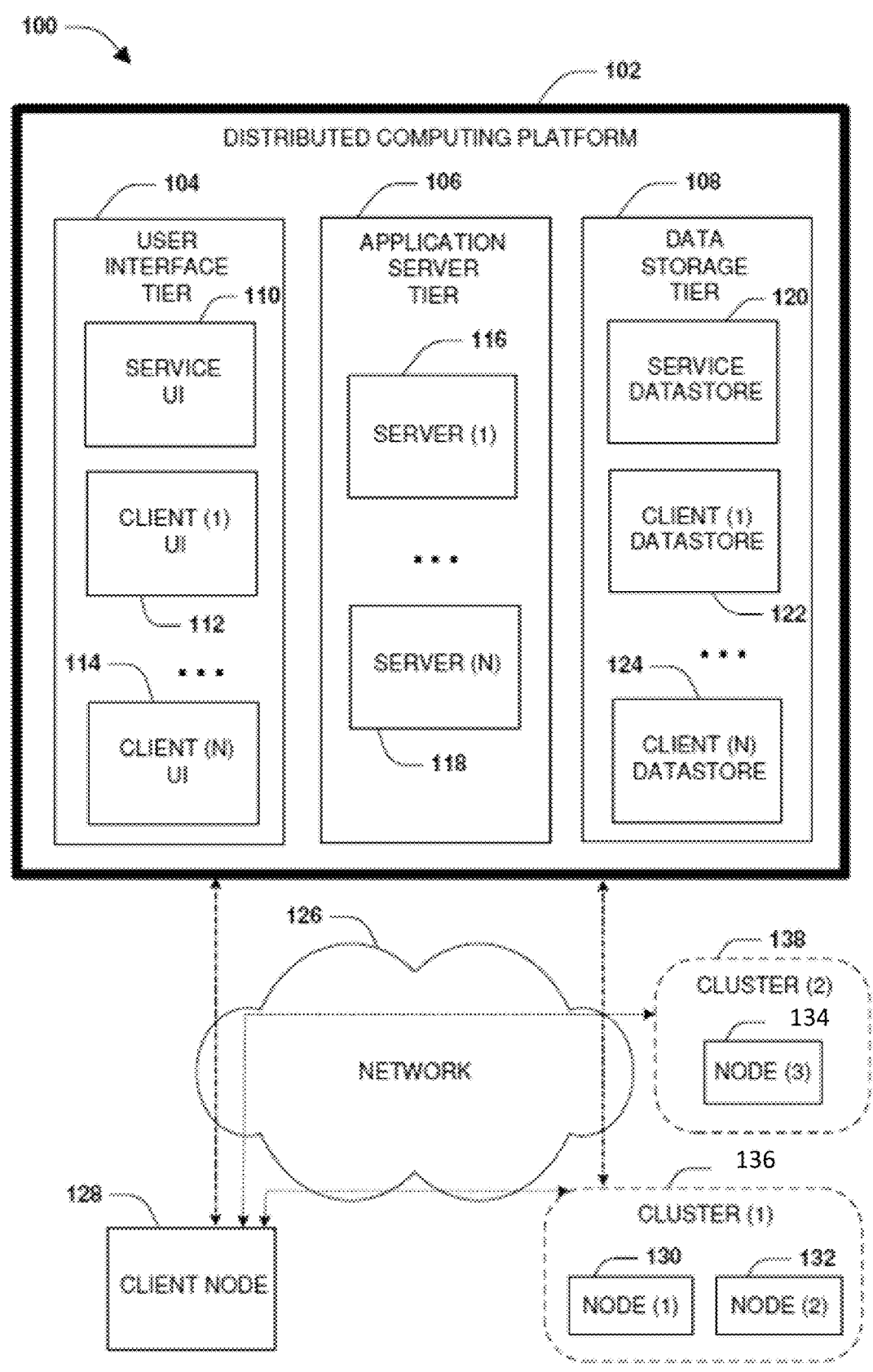
FIG. 1 is a schematic diagram illustrating a computing environment in accordance with one or more example embodiments.

The embodiments described herein recognize that it may be desirable to have improved methods and systems for handling data operations (e.g., write operations) in a multi-tiered storage environment. Some storage systems may provide clients with access to data stored within a plurality of storage devices. For example, a storage controller may store client data within a set of storage devices that are locally accessible (e.g., locally attached to the storage controller) or remotely accessible (e.g., accessible over a network).

The storage system may utilize a first storage tier (e.g., a performance storage tier, such as a solid state storage tier or a hard disk drive storage tier, locally hosted and/or maintained by nodes of a storage environment associated with the storage system), a second storage tier (e.g., a capacity storage tier such as an object store), and/or other tiers of storage. An object store may include, for example, on-premises object based storage, cloud based storage, a distributed network of storage provided by a third party provider, and/or some other type of storage.

Because a performance storage tier may provide lower latency than a capacity storage tier, more frequently accessed or more recently accessed data (e.g., hot data) may be stored within the performance storage tier. The performance storage tier may be scanned (e.g., via tiering scans) for data that is less frequently accessed. Less frequently accessed or less recently accessed data (e.g., cold data) may be migrated from the performance storage tier to the capacity storage tier.

This type of multi-tier storage solution enables policy-based data movement at the data block level depending on whether or not data is frequently accessed. Using this type of multi-tier storage and data movement solution may help reduce storage costs without compromising performance, efficiency, security, or protection. For example, moving less recently accessed data (e.g., cold data) to the second storage tier (e.g., cloud storage) may free space and resources for high-performance, mission-critical applications accessing data on the first storage tier.

In some cases, however, substantial expense may be incurred by storing data in the performance storage tier as compared to in the capacity storage tier. Further, in certain cases, a substantial amount of resources, time, and delay may be introduced when data is first written to the performance storage tier prior to being tiered out to the capacity storage tier.

In some cases, having to first write large amounts of data into the performance storage tier before moving the data to the capacity storage tier can cause undesirable delays and expense. Currently available mechanisms may use backend tiering scanning infrastructure that can be slow and inefficient when the size of the volume in use gets large. Further, some currently available mechanisms that allow for moving data from the performance storage tier to the capacity storage tier without the data needing to be identified as less frequently accessed (e.g., "cooled") may be unable to process incoming client write rates that are much faster than the rate at which data is tiered out from the performance storage tier to the capacity storage tier. Accordingly, it may be desirable to intake a large amount of data and be able to write that data directly to the capacity storage tier without filling up storage space in the performance storage tier.

Thus, the embodiments described herein provide one or more methods, systems, and non-tangible computer readable media for tiering out data with a bypass mechanism (e.g., volume-specific bypass write mode) that allows primary assignment of the data to the performance storage tier to be bypassed. In other words, the data may be directly assigned to a storage location in the capacity storage tier when the data is initially written such that the volume and client only see that the data has been written to the capacity storage tier. The data may be temporarily staged in a transfer data structure (e.g., a staging file) in the performance storage tier. The location of the data in the transfer data structure and the location in the capacity storage tier to which the data is assigned (and that will be used as the primary reference for the data) may be mapped to each other. For example, if access to the data is needed while the data is in the transfer data structure, the volume may reference the data using the location in the capacity storage tier, and a mapping may be used to identify the temporary staging location of the data in the transfer data structure. In this manner, assignment of the data ("writing" the data) to the performance storage tier may be bypassed and the data may be sent in object form to the capacity storage tier (e.g., to object based storage).

The embodiments described herein provide this type of bypass mechanism in a manner that is client-controllable such that the client can control whether a bypass write mode is enabled at the volume level. For each individual volume (e.g., composite aggregate representing storage in both performance tier and capacity tier), the client can enable or disable the bypass write mode.

For example, a request for writing data to a volume may be received from a client. A determination may be made that a bypass write mode has been enabled for the volume. The bypass write mode allows bypassing the performance storage tier (e.g., physical storage) and writing directly to the capacity storage tier (e.g., object based storage). The data may be temporarily staged in a transfer data structure that resides in the performance storage tier, but the data is assigned a location in the capacity storage tier such that the volume only sees that the data has been assigned to a location in the object based storage.

If space is available in the transfer data structure, then the request is processed, and the data is stored in the transfer data structure. Storing the data in the transfer data structure may be performed as part of building a new object that will be stored in the capacity storage tier or as part of building an already in progress object that will be stored in the capacity storage tier. In this manner, the data is temporarily staged in the transfer data structure as a part of assembling the object that will be send to the object based storage.

When the object is made ready and available for transfer, the object is generated and transferred to the object based storage. This transfer includes transferring the corresponding data in the transfer data structure to the object based storage belonging to the capacity storage tier. After the object is transferred to the object based storage, the data blocks in the transfer data structure that were used for that object are then free for use.

Using this type of bypass mechanism may improve overall write performance and storage efficiency and allow users to quickly ingest large amounts of data into object based storage without having to first fill up physical storage. Further, the bypass mechanism described herein enables a user/client to enable and disable the bypass write mode for a given volume, even with active client traffic, quickly and easily. For example, the bypass write mode can be enabled for a volume using a flag (e.g., on-disk flag) associated with the volume. The flag may be, for example, an attribute (e.g., Boolean field) in the volume information data structure of the volume that indicates whether the bypass write mode is enabled (e.g., flag set to "true") or disabled (e.g., flag set to "false"). In some cases, only users with advanced security privileges may be allowed to enable/disable the bypass write mode.

A client having the ability to enable the bypass mechanism to be able to write directly to object based storage (e.g., cloud storage) may be helpful for cases like data migrations, for example, where large amounts of data are transferred to a cluster, which may be more than the cluster can support on the performance storage tier (e.g., physical storage). Without the bypass write mode described herein, during a migration, numerous cycles of writing smaller amounts of data to the performance storage tier, then tiering out the data to the capacity storage tier, and then updating the primary references for the data would need to be completed until the migration is complete. This type of process may be more time-consuming and/or expensive than desired and may reduce overall performance of the storage system.

Further, the embodiments described herein recognize that the transfer data structure used for the above-described "staging" of the data that is to be written to the object based storage may also be used for staging other types of data. For example, even when a bypass write mode is not enabled for any volumes, the transfer data structure may be used for staging data associated with requests that are received from other sources. These other sources may also be referred to as consumers of the transfer data structure.

Recognizing that it may be desirable to control which source gets its data written to the transfer data structure and by how much at any time, the embodiments described herein provide methods and systems for controlling the writing of incoming data to the transfer data structure. The methods and systems described herein may help integrate volumes for which the bypass write mode has been enabled with the rest of the processes and/or features associated with the storage system (e.g., implemented using ONTAP™ storage operating system) such that the resource distribution is fair across the various consumers of the transfer data structure.

For example, a throttling system is provided that determines whether incoming data associated with certain requests needs to be throttled. Requests may be enqueued in one or more different throttling queues. The throttling system controls when the data for each request is written to the transfer data structure. The queues may have different priority levels. A queue that is a normal queue or of a lower priority may be processed at a slower rate than a queue that is of a higher priority. For example, smaller amount of space within the transfer data structure may be designated for processing the requests in a normal queue as compared to the amount of space in the transfer data structure designated for processing the requests in a high-priority queue. Further, the throttling system controls when throttling is halted such that request can be processed and data staged within the transfer data structure without the above-described restrictions on timing and/or speed.

II. Exemplary Architectures for Computing/Networking Environments

Referring now to the figures, FIG. 1 is a schematic diagram illustrating a computing environment 100 in accordance with one or more example embodiments. The computing environment 100 may be one example of an implementation for an environment in which selective tier write allocation is performed in a multi-tier storage environment. The computing environment 100 includes a distributed computing platform 102 that can be used to manage the storage of and access to data on behalf of client devices and/or storage resources. The distributed computing environment 100 may be implemented using a cloud storage environment, a multi-tenant platform, a hyperscale infrastructure comprising scalable server architectures, virtual networking, or a combination thereof. The computing environment 100 may be one example of an environment in which a multi-tier storage environment with a bypass mechanism, as described herein, for directly writing to object based storage may be implemented.

The distributed computing platform 102 may include, for example, a user interface tier 104, an application server tier 106, and a data storage tier 108. The user interface tier 104 may include a service user interface 110 and one or more client user interfaces for one or more respective client nodes. For example, the one or more client user interfaces may include client (1) user interface 112 and, in some cases, one or more other client user interfaces up to client (N) user interface 114. The application server tier 106 may include one or more servers including, for example, server (1) 116 up to server (N) 118. The number of servers in application server tier 106 may be the same as or different from the number of client user interfaces in user interface tier 104. The data storage tier 108 includes service datastore 120 and one or more client datastores for one or more respective client nodes. For example, the one or more client datastores may include client (1) datastore 122 and, in some cases, one or more other client datastores up to client (N) datastore 124.

The distributed computing platform 102 is in communication via network 126 with one or more client nodes (e.g., client node 128), one or more nodes (e.g., a first node 130, a second node 132, a third node 134, etc.), or both, where the various nodes may form one or more clusters (e.g., a first cluster 136, a second cluster 138, etc.). The embodiments described herein may include actions that can be implemented within a client node (e.g., the client node 128), one or more nodes (e.g., the first node 130, the second node 132, the third node 134), or both. A node may include a storage controller, a server, an on-premise device, a virtual machine such as a storage virtual machine, hardware, software, or a combination thereof. The one or more nodes may be configured to manage the storage and access to data on behalf of the client node 128 and/or other client devices.

One or more of the embodiments described herein include operations implemented across the distributed computing platform 102, client node 128, one or more of first node 130, second node 132, and/or third node 134, or a combination thereof. For example, the client node 128 may transmit operations, such as data operations to read data and write data, and metadata operations (e.g., a create file operation, a rename directory operation, a resize operation, a set attribute operation, etc.), over the network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 134, a storage virtual machine executing within the distributed computing platform 102, etc., so that one or more replicas of the data are maintained. For example, the third node 134 may host a destination storage volume that is maintained as a replica of a source storage volume of the first node 130. Such replicas can be used for disaster recovery and failover.

In one or more embodiments, the techniques described herein include actions implemented by a storage operating system or are implemented by a separate module that interacts with the storage operating system. The storage operating system may be hosted by the client node 128, the distributed computing platform 102, or across a combination thereof. In an example, the storage operating system may execute within a storage virtual machine, a hyperscaler, or some other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write-anywhere file layout for a volume where modified data for a file may be written to any available location as opposed to a write-in-place architecture where modified data is written to the original location, thereby overwriting the previous data.

In one or more embodiments, the file system may be implemented through a file system layer that stores data of the storage objects in an on-disk format representation that is block-based (e.g., data may be stored within 4 kilobyte blocks). Pointer elements may be used to identify files and file attributes such as creation time, access permissions, size and block location, other types of attributes, or a combination thereof. Such pointer elements may be referred to as index nodes (inodes). For example, an inode may be a data structure that points to a file system object (e.g., a file, a folder, or a directory) in the file system. The inode may point to blocks that make up a file and may also contain the metadata of the file. In some cases, an inode may itself have a certain capacity and may be able to store a file itself. As one example, the inode may have a 288-byte capacity and may be capable of storing a file that is less than 64 bytes. In one or more embodiments, a given volume may have a finite number of inodes.

In one or more embodiments, deduplication may be implemented by a deduplication module associated with the storage operating system to improve storage efficiency. For example, inline deduplication may ensure blocks are deduplicated before being written to a storage device. Inline deduplication uses a data structure, such as an in-core hash store, which maps fingerprints of data-to-data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In one or more embodiments, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In one or more embodiments, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the computing environment 100, such as between the first node 130 of the first cluster 136 and the third node 134 of the second cluster 138 and/or between a node of a cluster and an instance of a node or virtual machine in the distributed computing platform 102.

For example, during synchronous replication, the first node 130 may receive a write operation from the client node 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client node 128 for the write operation until the write operation is executed upon the volume and the first node 130 receives the success message that the second node 132 executed the replicated write operation upon the replica volume.

In other embodiments, asynchronous replication may be implemented, such as between the first node 130 and the third node 134. It may be appreciated that the synchronization module may implement asynchronous replication between any devices within the computing environment 100, such as between the first node 130 of the first cluster 136 and the distributed computing platform 102. In an example, the first node 130 may establish an asynchronous replication relationship with the third node 134. The first node 130 may capture a baseline snapshot of a first volume as a point in time representation of the first volume. The first node 130 may utilize the baseline snapshot to perform a baseline transfer of the data within the first volume to the third node 134 in order to create a second volume within the third node 134 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In one or more embodiments, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service datastore 120. Further, the data storage tier 108 may store client specific data within client data stores assigned to such clients such as a client (1) datastore 122 used to store data of a client (1) and a client (N) datastore 124 used to store data of a client (N). The data stores may be physical storage devices or may be defined as logical storage, such as a virtual volume, logical unit numbers (LUNs), or other logical organizations of data that can be defined across one or more physical storage devices. In another example, the first node 130 transmits and stores all client data to the distributed computing platform 102. In yet another example, the client node 128 transmits and stores the data directly to the distributed computing platform 102 without the use of the first node 130.

The management of storage and access to data can be performed by one or more storage virtual machines (SVMs)

or other storage applications that provide software as a service (SaaS) such as storage software services. In one example, an SVM may be hosted within the client node 128, within the first node 130, or within the distributed computing platform 102 such as by the application server tier 106. In another example, one or more SVMs may be hosted across one or more of the client node 128, the first node 130, and the distributed computing platform 102. The one or more SVMs may host instances of the storage operating system.

In one or more embodiments, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) datastore 122. Thus, an SVM executing on the server (1) 116 may receive data and/or operations from the client node 128 and/or the first node 130 over the network 126. The SVM executes a storage application and/or an instance of the storage operating system to process the operations and/or store the data within the client (1) datastore 122. The SVM may transmit a response back to the client node 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client node 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client node 128 and/or the first node 130 may subscribe to certain types and amounts of services and resources provided by the distributed computing platform 102. For example, the client node 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client node 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of computing devices include, but are not limited to, personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of networks include, but are not limited to, networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, which may be implemented using a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service datastore 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
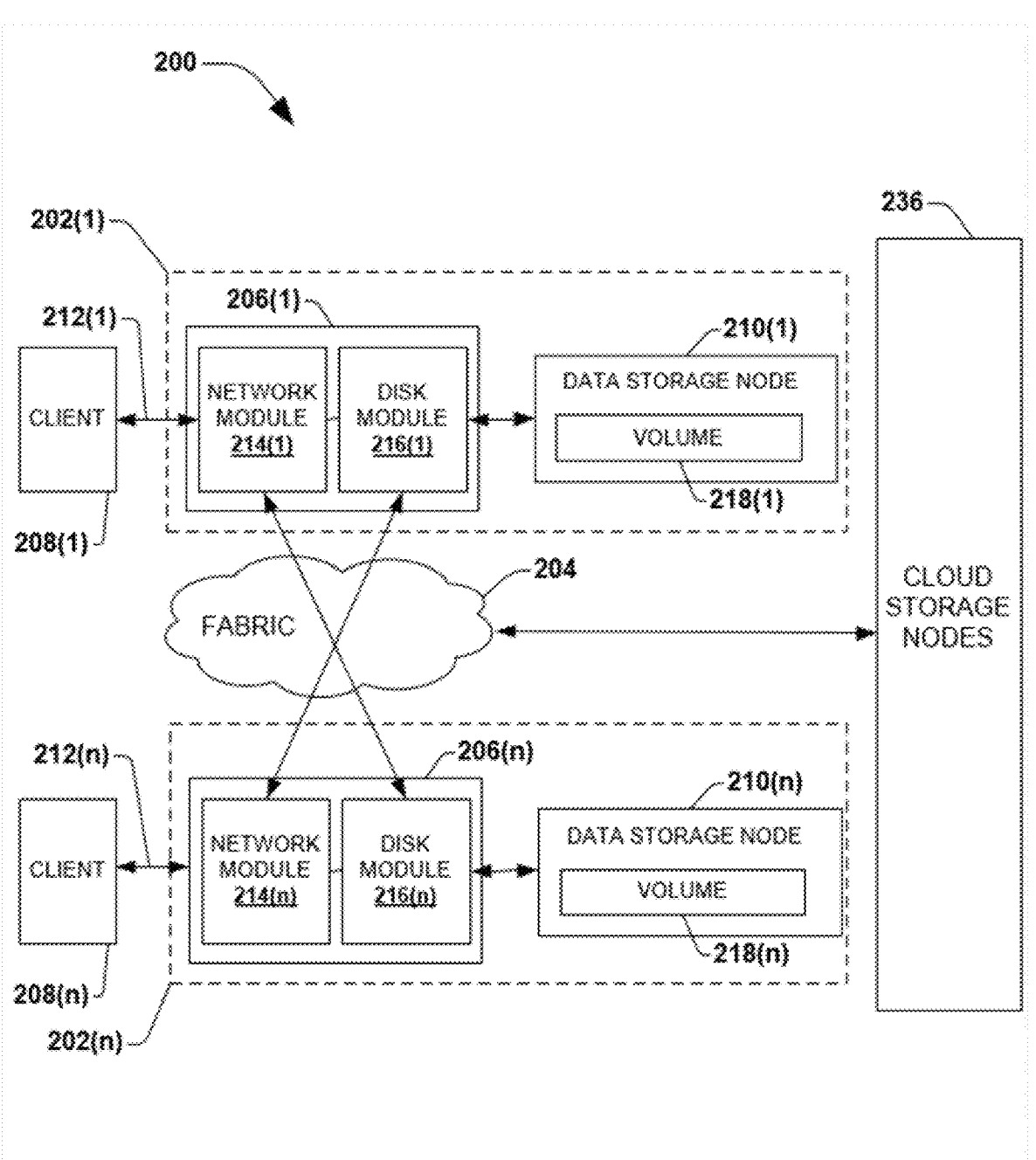
FIG. 2 is a schematic diagram illustrating a network environment in accordance with one or more example embodiments.

FIG. 2 is a schematic diagram illustrating a network environment 200 in accordance with one or more example embodiments. The network environment 200 illustrates another architecture for the principles described above with respect to Fig. The network environment 200, which may take the form of a clustered network environment, includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n) (also referred to as node computing devices), for example), although any number of other elements or components can also be included in the network environment 200 in other examples. This technology provides a number of advantages including methods, non-transitory computer-readable media, and computing devices that implement the techniques described herein. Further, the network environment 200 may be one example of an environment in which a multi-tier storage environment with a bypass mechanism, as described herein, for directly writing to object based storage may be implemented.

In this example, node computing devices 206(1)-206(n) can be primary or local storage controllers or secondary or remote storage controllers that provide client devices 208(1)-208(n) (also referred to as client nodes) with access to data stored within data storage nodes 210(1)-210(n) (also referred to as data storage devices) and cloud storage node(s) 236 (also referred to as cloud storage device(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage nodes 210(1)-210(n) managed by a network storage controller configured to process I/O commands issued by the client devices 208(1)-208(n))), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage node(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage nodes 210(1)-210(n) in the event a disaster occurs at a disaster storage site (e.g., the node computing device 206(1) provides client device 208(n) with switchover data access to data storage nodes 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers)

to connect with client devices 208(1)-208(n) over the network connections 212(1)-212(n), for example, allowing the client devices 208(1)-208(n) to access data stored in the network environment 200.

Further, the network modules 214(1)-214(n) can provide connections with one or more other components through the cluster fabric 204. For example, the network module 214(1) of node computing device 206(1) can access the data storage node 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage node 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage nodes 210(1)-210(n), such as disks or arrays of disks, SSDs, flash memory, or some other form of data storage, to the node computing devices 206(1)-206(n). Often, disk modules 216(1)-216(n) communicate with the data storage nodes 210(1)-210(n) according to the SAN protocol, such as SCSI or FCP, for example, although other protocols can also be used. Thus, as seen from an operating system on node computing devices 206(1)-206(n), the data storage nodes 210(1)-210(n) can appear as locally attached. In this manner, different node computing devices 206(1)-206(n), etc. may access data blocks, files, or objects through the operating system, rather than expressly requesting abstract files.

While the network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the network connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the data storage apparatuses 202(1)-202(n) host aggregates corresponding to physical local and remote data storage devices, such as local flash or disk storage in the data storage nodes 210(1)-210(n), for example. One or more of the data storage nodes 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage nodes 210(1)-210(n) and one or more of the cloud storage node(s) 236 to provide tiered storage, for example, and other arrangements can also be used in other examples.

In one example, to facilitate access to data stored on the disks or other structures of the data storage nodes 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 210(1)-210(n) can have one or more physical ports, wherein each physical port can be assigned a target address (e.g., SCSI target address). To represent respective volumes, a target address on the data storage nodes 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

The present embodiments may be implemented using hardware, software, firmware, or a combination thereof. Accordingly, it is understood that any operation of the computing systems of the computing environment 100, the network environment 200, or both may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Figure 3:
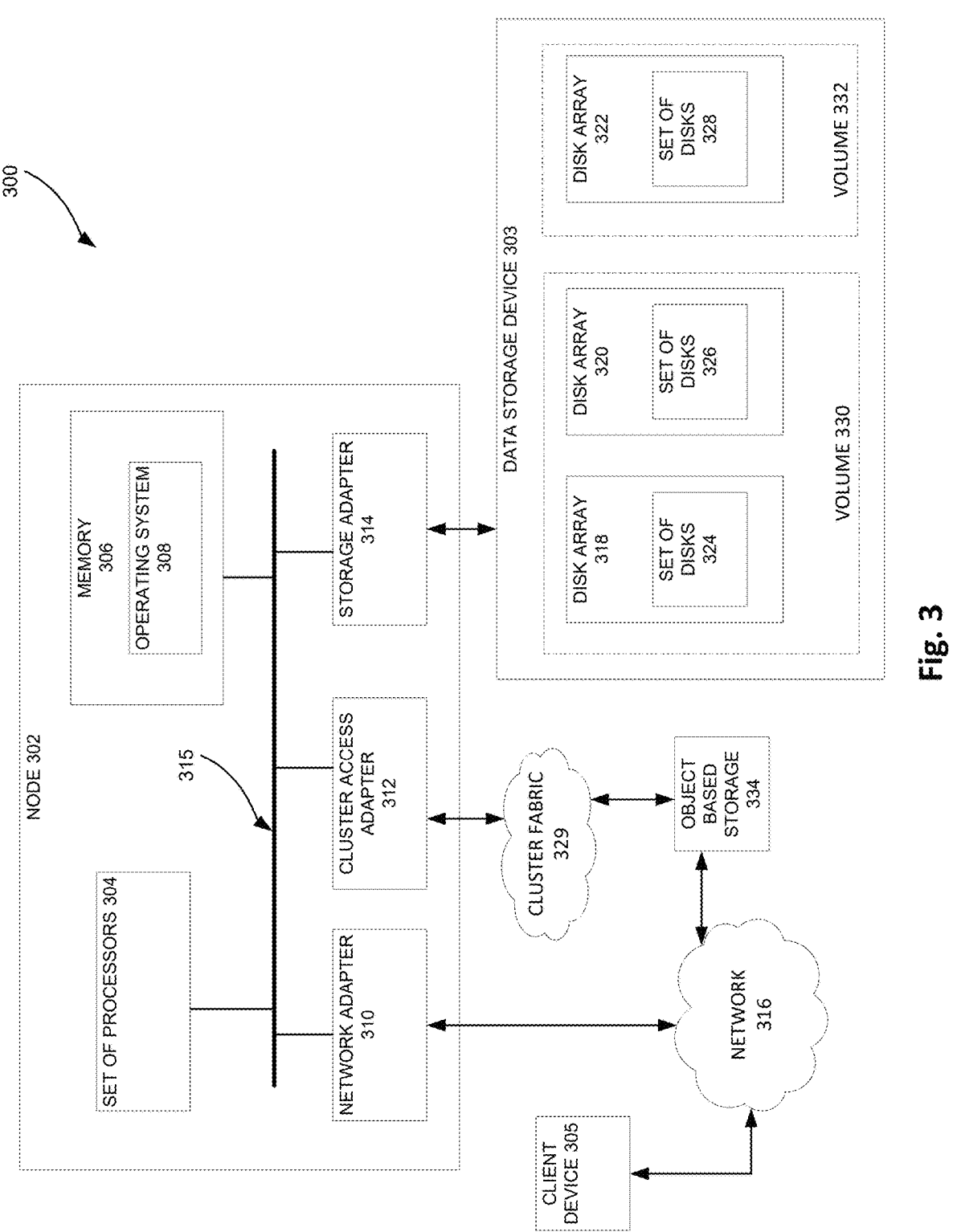
FIG. 3 is a schematic diagram of a data storage system in accordance with one or more embodiments.

FIG. 3 is a schematic diagram of a data storage system in accordance with one or more embodiments. The data storage system 300, which may be one example of an implementation for, e.g., one of data storage apparatuses 202(1)-202(n), may include a node 302, which may be one example of an implementation for one of node computing devices 206(1)-206(n), and a data storage device 303, which may be one example of an implementation for one of data storage nodes 210(1)-210(n).

In one or more embodiments, the node 302 may be a general purpose computer, for example, or some other computing device particularly configured to operate as a storage server. In one or more embodiments, the node 302 comprises one or more processors 304, a memory 306 (e.g., which may include an operating system 308 installed in the memory 306), a network adapter 310, a cluster access adapter 312, a storage adapter 314, or a combination thereof interconnected by a system bus 315. The operating system 308 may be installed to, for example, implement a Redundant Array of Independent (or Inexpensive) Disks (RAID) optimization technique to optimize a reconstruction process of data of a failed disk in an array.

A client (e.g., a client device 305 such as a computing device) may be connected to the node 302 over a network 316, for example, to gain access to files and/or other data stored on the data storage device 303. A client can be the entire system of a company, a department, a project unit or any other entity. Each client may be uniquely identified and optionally, may be a part of a logical structure called a storage tenant. The storage tenant may represent a set of users (which may be referred to as storage consumers) for a storage provider (which may also be referred to as an object based storage manager (e.g., cloud manager, where cloud computing is being utilized)). Where a storage provider is being used, the client may accesses storage through the storage provider. It is noteworthy that the adaptive aspects of the present disclosure are not limited to using a storage provider or a storage tenant and may be implemented for direct client access.

In one or more embodiments, the node 302 comprises a storage controller that provides client devices (e.g., such as client device 305) with access to data stored within data storage device 303. The client device 305 may be, for example, without limitation, a general-purpose computer configured to execute applications. As described above, the client device 305 may interact with the data storage system 300 in accordance with a client/host model of information delivery.

The data storage device 303 may include various storage devices that are part of disk arrays, such as, for example, disk array 318, disk array 320, and disk array 322. Disk array 318, disk array 320, and disk array 322 may include, for example, a set of disks 324, a set of disks 326, and a set of disks 328, respectively. In some embodiments, the set of disks 324, the set of disks 326, and/or the set of disks 328 may include any number of or combination of types of mass storage devices, including but not limited to magnetic disk drives, flash memory, and any other similar media adapted to store information, including, for example, data (D) and/or parity (P) information.

In one or more embodiments, the operating system 308 can also manage communications for the data storage system, and communications between other data storage systems that may be in a clustered network, such as attached to a cluster fabric 329, which may be one example of an implementation for cluster fabric 204 in FIG. 2. Thus, the node 302 (e.g., a network storage controller) can respond to client requests (e.g., host device requests) to manage data on the data storage device 303 (e.g., or additional clustered devices) in accordance with these requests.

In one or more embodiments, the operating system 308 can often establish one or more file systems on the data storage system 300, where a file system can include software code and data structures that implement a persistent hierarchical namespace of files and directories, for example. As an example, when a new data storage device (not shown) is added to a clustered network system, the operating system 308 is informed where, in an existing directory tree, new files associated with the new data storage device are to be stored. This may be referred to as "mounting" a file system.

In the example data storage system 300, memory 306 can include storage locations that are addressable by the one or more processors 304 and adapters (e.g., network adapter 310, cluster access adapter 312, and/or storage adapter 314) for storing related software application code and data structures. The one or more processors 304 and adapters (e.g., network adapter 310, cluster access adapter 312, and/or storage adapter 314) may, for example, include processing elements and/or logic circuitry configured to execute the software code and manipulate the data structures.

The operating system 308, portions of which may reside in the memory 306 and be executed by the processing elements, may functionally organize the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system 308 may also use one or more control files (not shown) to aid in the provisioning of virtual machines.

The network adapter 310 can include the mechanical, electrical and signaling circuitry needed to connect the data storage system 300 to a client (e.g., client device 305) over a network (e.g., network 316). The network may include, for example, without limitation, among other things, a point-to-point connection or a shared medium, such as a local area network.

The storage adapter 314 cooperates with the operating system 308 executing on the node 302 to access information requested by the client device 305 (e.g., access data on a storage device managed by a network storage controller). The information may be stored on any type of attached array of writeable media such as magnetic disk drives, flash memory, and/or any other similar media adapted to store information. In the example data storage system 300, the information can be stored in data blocks on the set of disks 324, set of disks 326, and/or set of disks 328.

The storage adapter 314 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 314 and, if necessary, processed by the one or more processors 304 (or the storage adapter 314 itself) prior to being forwarded over the system bus 315 to the network adapter 310 (and/or the cluster access adapter 312 if sending to another node in the cluster) where the information is formatted into a data packet and returned to the client device 305 over the network 316 (and/or returned to another node attached to the cluster over the cluster fabric 329).

In one embodiment, storage of information on disk arrays 318, 320, 322 can be represented by one or more storage volumes. For example, disk array 318 and disk array 320 may be represented by logical storage volume 330, while disk array 322 may be represented by logical storage volume 332. The operating system 308 may implement a file system for these storage volumes (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

The operating system 308 may also allow for data storage on object based storage 334 e.g., on-premises storage and/or cloud storage). Access to object based storage 334 may be provided via network 316, cluster fabric 329, or both.

Multi-tier write allocation may be implemented for the data storage system 300 and may include, for example, a performance tier that includes physical storage (e.g., data storage device 303) and a capacity tier (e.g., object based storage 334). The node 302 may utilize a multi-tier storage environment for serving client requests, including write requests. It may be appreciated that multi-tier write allocation may be implemented for and/or between any type of computing environment, and may be transferrable between physical devices (e.g., node 302, client device 305, a desktop computer, a tablet, a laptop, a wearable device, a mobile device, a storage device, a server, etc.) and/or a cloud computing environment (e.g., remote to the node 302 and/or the client device 305).

III. Exemplary Architecture for Multi-Tier Storage Environment

IV. General Overview

Figure 4A:
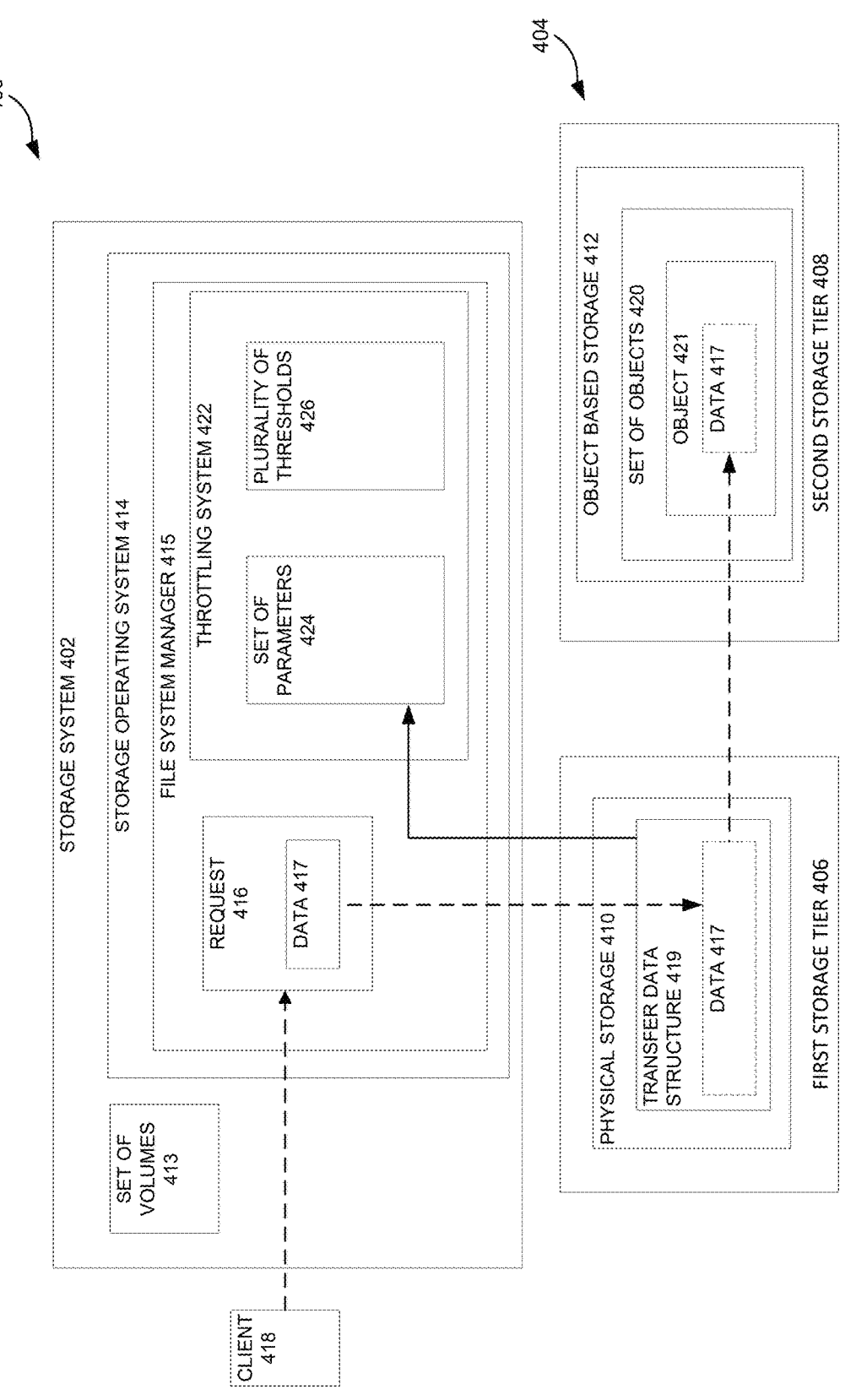
FIGS. 4A-4B are schematic diagrams of a system for managing a multi-tier storage environment in accordance with one or more embodiments.
Figure 4B:
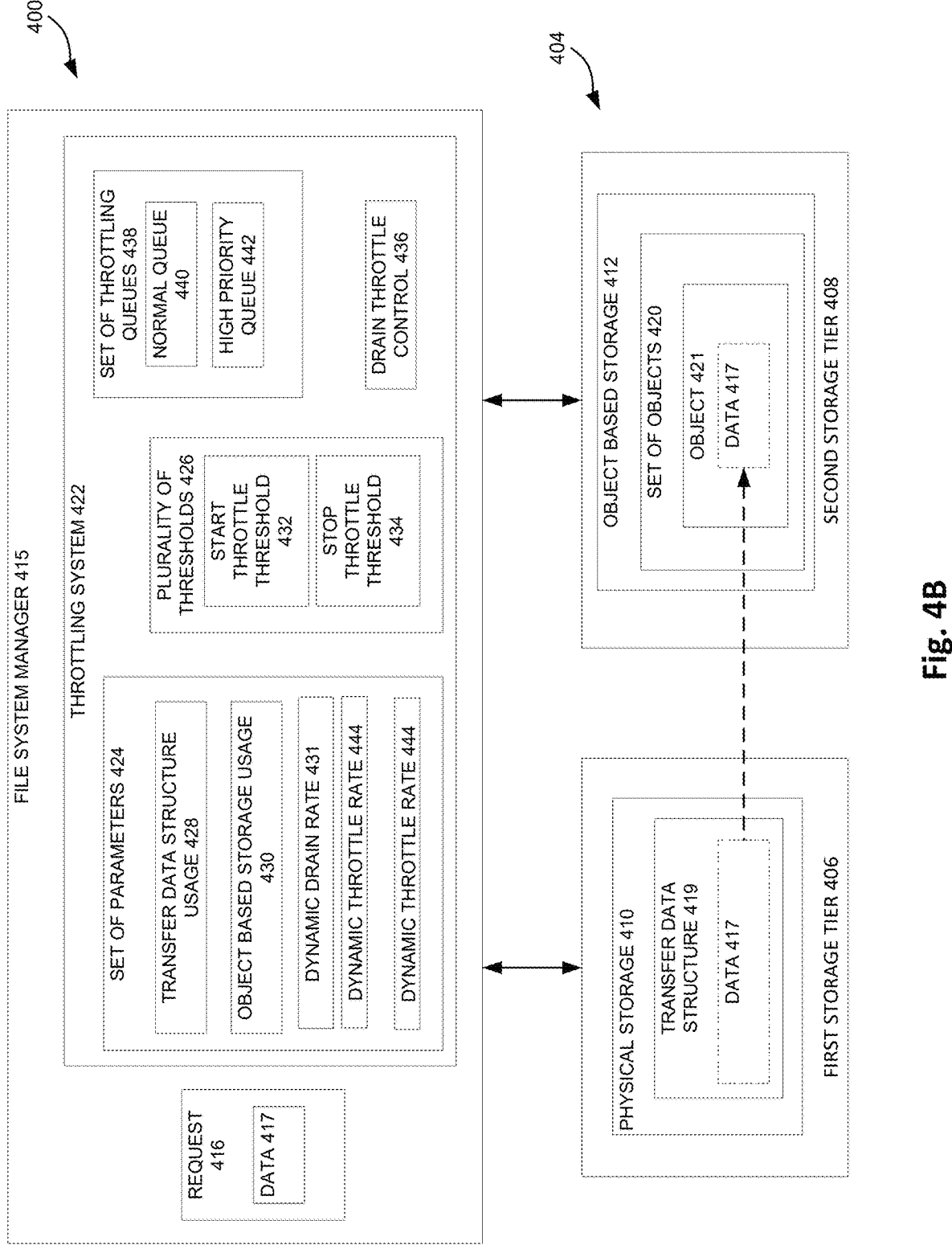

FIGS. 4A-4B are schematic diagrams of a system for managing a multi-tier storage environment in accordance with one or more embodiments. The below description for each of these figures may be made with respect to the elements and reference numbers in both figures.

FIG. 4A is a schematic diagram of a system for performing selective write allocations in a multi-tier storage environment in accordance with one or more embodiments. The system 400 may include, for example, a storage system 402 that hosts and/or manages various forms of storage that may logically referred to as being within a plurality of storage tiers 404. The plurality of storage tiers 404 may include, for example, without limitation, a first storage tier 406, a second storage tier 408, and optionally, one or more other storage tiers. In this manner, multi-tier storage environment used by the storage system 404 to store data.

The first storage tier 406 may include, for example, storage that is locally accessible to one or more nodes of one or more clusters associated with the storage system 402. In one or more embodiments, first storage tier 406 includes physical storage 410. Physical storage 410 may include mass storage devices such as, for example, without limitation, solid state drives (SSDs), writable storage device media such as hard disk drives (HDD), magnetic disks, video tape, optical, DVD, magnetic tape, and any other similar media adapted to store information. The storage media included in physical storage 410 may be organized as one or more groups of Redundant Array of Independent (or Inexpensive) Disks (RAID). The various aspects disclosed are not limited to any particular storage device type or storage device configuration. Physical storage 410 may include, for example, without limitation, one or more of data storage device 303 described with respect to in FIG. 3.

The second storage tier 408 may include, for example, without limitation, object based storage 412, which may include a set of object based data stores (which may be also referred to as a set of object based stores). The term object can refer to a chunk of data written together. In one or more embodiments, data stored at is managed using an object identifier and an offset value within the object, as described below in detail. The object based storage 412 may include, for example, without limitation, on-premises (on-prem) storage, cloud storage, or both. As one example, object based storage 412 may exist in a cloud based environment. In various embodiments, the second storage tier 408 may operate slower than the first storage tier 406, while the first storage tier 406 may be faster but more expense than the second storage tier 408.

In some cases, the first storage tier 406 is referred to as a performance tier, while the second storage tier 408 is referred as a capacity tier. In other cases, the first storage tier 406 is referred to as a physical storage tier (or local storage tier), while the second storage tier 408 is referred to as an object based storage tier (or remote storage tier).

The storage system 402 may provide a set of volumes 413 (e.g., a set of logical storage volumes such as a set of logical unit numbers (LUNs)) that presents storage space (e.g., storage space within physical storage 410, storage space within object based storage 412) to clients and virtual machines (VMs) for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space. For example, a single volume may represent storage space within physical storage 410, storage space within object based storage 412, or both.

The storage system 402 may execute, for example, a storage operating system 414 that organizes the storage into the set of volumes 413 (e.g., set of logical storage volumes) and implements a file system that logically organizes stored information as a hierarchical structure for files/directories/objects at the storage devices. Examples of how a storage system (e.g., storage system 402), storage operating system (e.g., storage operating system 414), and file system may be implemented, as well as other features related to the components described herein (e.g., with respect to at least FIGS. 1-4) are described in U.S. Pat. Nos. 9,965,195, 9,959,056, 10,489,073, 11,709,603, and 11,354,049, each of which is incorporated by reference herein in its entirety.

In one or more embodiments, each "on-disk" file may be implemented as set of blocks configured to store information, such as text, whereas a directory may be implemented as a specially formatted file in which other files and directories are stored. These data blocks are organized within a volume block number (VBN) space that is maintained by a file system of the storage operating system 414 described below in detail. The file system may also assign each data block in the file a corresponding "file offset" or file block number (FBN). The file system may assign sequences of FBNs on a per-file basis, whereas VBNs may be assigned over a larger volume address space. The file system organizes the data blocks within the VBN space as a logical volume. The file system may include a contiguous range of VBNs from zero to n, for a file system of size n–1 blocks.

An example of storage operating system 414 is the Data ONTAP™ storage operating system available from NetApp, Inc. that implements a Write Anywhere File Layout (WAFL) file system (without derogation of any trademark rights of NetApp Inc.). Of course, the various aspects disclosed herein are not limited to any specific file system type and may be implemented by other file systems.

The storage operating system 414 may further implement a storage module (for example, a RAID system for the first storage tier 406 that manages the storage and retrieval of the information to and from storage devices in accordance with input/output (I/O) operations. When accessing a block of a file in response to servicing a client request, the file system specifies a VBN that is translated at the file system/RAID system boundary into a disk block number (DBN) location on a particular storage device (disk, DBN) within a RAID group of the physical volume. Each block in the VBN space and in the DBN space may be fixed, e.g., 4 k bytes (kB), in size; accordingly, there may be a one-to-one mapping between the information stored on the disks in the DBN space and the information organized by the file system in the VBN space.

In one or more embodiments, a requested block is retrieved from a storage device and stored in a buffer cache of a memory of the storage system 402 as part of a buffer tree of the file. The buffer tree is an internal representation of blocks for a file stored in the buffer cache and maintained by the file system. Broadly stated and as described below in detail, the buffer tree has an inode at the root (top-level) of the file, as described below.

An inode is a data structure used to store information, such as metadata, about a file, whereas the data blocks are structures used to store the actual data for the file. The information in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a VBN to facilitate efficiency among the file system and the RAID system when accessing the data.

In one or more embodiments, volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference the indirect blocks of the inode file that, in turn, reference direct blocks of the inode file. Within each direct block of the inode file are embedded inodes, each of which may reference indirect blocks that, in turn, reference data blocks (also shown as L0 blocks) of a file.

In one or more embodiments, a client may transmit one or more input/output (I/O) commands, such as a CFS or NFS request, over a network (e.g., network 126 in FIG. 1) to the storage system 402. The storage system 402 receives the request, issues one or more I/O commands to storage devices to read or write the data on behalf of the client system, and issues a CIFS or NFS response containing the requested data over the network to the respective client system.

In one or more embodiments, the system 400 may include a virtual machine environment where a physical resource (e.g., physical storage) is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources." Different vendors may provide different virtualization environments, for example, VMware Corporation, Microsoft Corporation and others. Data centers may have hybrid virtualization environments/technologies, for example, Hyper-V and hypervisor based virtual environment. The features described with respect to computing environment 100 in FIG. 1, network environment 200 in FIG. 2, data storage system 300 in FIG. 3, and/or system 400 in FIGS. 4A-4B may be customized for implementation with respect to one or more different virtual environments. The virtualization environment(s) may use different hardware and/or software components and configurations.

A file system manager 415 may be implemented within storage operating system 414 to manage the file system implemented with storage operating system 414. For example, the file system manager 415 may keep track of a hierarchical structure of the data stored in the storage devices and manage read/write operations (e.g., execute read/write operation(s) on storage in response to client requests. Further, the file system manager 415 may manage various types of requests, received from various sources, for storing incoming data that has yet to be stored in any one or more of plurality of storage tiers 404. A source may be a client (e.g., a third-party user/client device) or a set of software-based processes. A software-based process that may be a "source" may be comprised of, for example, without limitation, at least one of an application, a process internal to or otherwise associated with storage system 402, a background process, a third-party process, a piece of code, a model, an algorithm, a policy-based process (e.g., a series of steps or functions implemented based on a policy), or some other type of software-based process.

In one or more embodiments, the file system manager 415 may receive a request 416 to write data 417 to second storage tier 408. For example, the file system manager 415 may receive a request 416 to write (or store) data 417 to object based storage 412 within second storage tier 408. Data 417 may also be referred to as incoming data.

The request may be received from a source that can take different forms. In one or more embodiments, the source may be, for example, a client 418. For example, the request 416, au be to write data 417 to a volume (e.g., a volume in set of volumes 413). The volume may be one that belongs to a composite aggregate that represents storage from at least both of first storage tier 406 and second storage tier 408. For example, the volume may be one that belongs to a composite aggregate that represents at least one of a physical storage device of the physical storage 410 and at least one of an object store of the object based storage 412. In other embodiments, the request 416 may be received from a source that includes a software-based process such as, for example, an application. In some cases, the process may be a policy-based process that is based on a policy such as, for example, a mirroring policy, a snapshot policy, a backup policy, and/or some other type of policy.

In one or more embodiments, data 417 is directly written to first storage tier 406. In certain instances, the data 417 may permanently reside on the first storage tier 406. In other instances, at some future point in time, the file system manager 415 may identify that the data 417 (or some portion of the data 417) is to be sent to the second storage tier 408. For example, the file system manager 415 may identify (e.g., may receive an indication) that the data 417 in the first storage tier 406 is to be moved to the second storage tier 408 to reduce, e.g., an expense associated with storing the data in the first storage tier 406.

In one or more embodiments, the file system manager 415 may identify that the data 417 satisfies a set of criteria (e.g., at least a selected amount of time has passed since the data 417 has been accessed, a frequency at which the data 417 is accessed is less least a selected amount of time, etc.) or may receive an indication or message indicating that a property associated with the data 417 or the data 417 itself has satisfied a set of criteria. For example, the file system manager 415 may determine that the "temperature" of the data 417 stored in the first storage tier 406. "Hot" data may include data that is frequently accessed, based on a selected (e.g., predefined/predetermined) duration. "Cold" data may include data that is not frequently accessed with respect to a selected (e.g., predefined/predetermined) frequency metric and/or that has not been accessed in at least a selected (e.g., predefined/predetermined) amount of time.

When the request 416 received by the file system manager 415 is for moving data 417 in the first storage tier 406 to the second storage tier 408, the file system manager 415 may use a transfer data structure 419 to stage the data 417 before sending the data 417 to the second storage tier 408. The transfer data structure 419, which may be also referred to as a transfer log, TLOG, staging area, or staging data structure, is used to buffer or otherwise temporarily hold data and/or information about data that is to be sent to the second storage tier 408. The transfer data structure 419 may be, for example, a data structure, such as a file or staging file, that is comprised of a plurality of data blocks and that has a file block number (FBN). The transfer data structure 419 may serve as a buffer for the data 417. Using the transfer data structure 419 enables storage operating system consistency for a data tiering process and also helps avoid updating block pointers when data is moved.

In FIG. 4A, the transfer data structure 419 is shown as residing in the first storage tier 406 (e.g., on an aggregate in physical storage 410). However, in other embodiments, transfer data structure 419 may belong to some other tier of plurality of storage tiers 404, other than first storage tier 406 or second storage tier 408.

Staging the data 417 using transfer data structure 419 may include adding data to one or more existing objects and/or building a set of objects 420 for the data 417 that is to be written to the second storage tier 408. The set of objects 420, which includes one or more objects, will be stored in the second storage tier 408 and will include the data 417 associated with the request 416. The data 417 may be staged (e.g., "held" or "staged") in one or more data blocks of the transfer data structure 419 and mapped to the set of objects 420 via an object staging data structure.

When the file system manager 415 receives the request 416, the file system manager 415, the file system manager 415 may perform a number of actions and/or make a number of decisions prior to processing the request 416 and adding the data 417 to the transfer data structure 419. For example, the file system manager 415 may check to confirm that there is sufficient space available in the transfer data structure 419 for each object that is to be written. When space is unavailable in the transfer data structure 419 for an object (e.g., object 421), the file system manager 415 may send an error message to the client. For example, the error message may be a retriable error message that allows the user to retry the write operation.

Further, when the file system manager 415 receives the request 416, the file system manager 415, the file system manager 415 may determine whether an object is already currently being built for the second storage tier 408 (e.g., the object based storage 412). For example, an object staging data structure may be scanned to determine whether an object build is already in process. If no build is currently in process, then a new set of objects 420 is built using the data 417. If an object build is in process (e.g., for object 421), the object 421 is further assembled (e.g., filled) using the data 417 or at least a portion of the data 417 and an object staging data structure is then updated. If another object is needed to complete staging of any remaining portion of the data 417, then one or more new objects are built. In this manner, the set of objects 420 used for the data 417 may include an object that is has been partially filled with the data associated with another request, an object that has been partially filled with the data 417 associated with the request 416, and/or an object that has been fully filled with the data 417 associated with the request 416. Examples of how the transfer data structure 419 and object staging data structure may be managed are described in greater detail in U.S. Pat. Nos. 9,965,195, 9,959,056, 10,489,073, 11,709,603, and 11,354, 049, each of which is incorporated by reference herein in its entirety.

When a given object becomes "available" for transfer, the object (e.g., object 421) is sent from the transfer data structure 419 to the second storage tier 408 (e.g., object based storage 412). The object 421 may become "available" when one or more criteria are met. For example, the criteria may include the object being filled with data. In some cases, the criteria may include a selected number (e.g., a batch) of objects being filled or containing sufficient data for transfer.

Once the data portion of an object 421 has been built and is ready for transfer to the second storage tier 408 (e.g., enough data is available for an object to be generated and stored in the object based storage 412), the object 421 is generated. The transfer data structure 419 and an object metafile (or data structure) can be used to create the object 421 in memory and transfer the corresponding data blocks in the transfer data structure 419 to the second storage tier 408. Those data blocks in the transfer data structure 419 are then freed for use for other incoming data.

In one or more embodiments, each object of the set of objects 420 is generated using the data 417, one or more different types of metadata, and/or one or more different types of context. In one or more embodiments, an object (e.g., object 421) of the set of objects 420 includes one or more object pages corresponding to data chunks, such as data chunks derived from the data 417 associated with the request 416. In one illustrative example, an object may include space for 1024 object pages, such as a first object page, a second object page, and/or other one or more object pages. In some cases, one or more of these object pages may include a data chunk (e.g., 4 kilobytes of data or any other size of data) and a context associated with the object page. For example, the first object page may include a corresponding first data chunk (e.g., 4 kilobytes of data or any other size of data) and a corresponding first context associated with the first object page. A second object page may include a corresponding second data chunk (e.g., 4 kilobytes of data or any other size of data) and a corresponding second context associated with the second object page. Examples of how the set of objects 420 may be assembled, generated, and then transferred to the second storage tier 408 may be provided by the various systems and methodologies described in U.S. Pat. Nos. 9,965,195, 9,959,056, 10,489,073, 11,709,603, and 11,354,049, each of which is incorporated by reference herein in its entirety.

In certain instances, it may be desirable to write incoming data directly to the second storage tier 408. For example, moving data from the first storage tier 406 to the second storage tier 408 may require (in some instances) updating the file system to use the storage format (e.g., block identifiers, etc.) of the storage (e.g., object based storage 412) in the second storage tier 408, which is different from the storage format of the storage (e.g., physical storage 410) in the first storage tier 406. In some cases, it may be desirable to store certain types of incoming data within the second storage tier 408 and not the first storage tier 406. For example, it may be desirable to directly write backup data, infrequently accessed data, data not recently accessed, backup data that is being backed up from a source volume to a destination backup volume, and/or data associated with a storage policy to the second storage tier 408. The storage policy may be, for example, a mirroring policy such that the data corresponds to mirrored data that is mirrored from a source to a destination, a backup policy such that the data corresponds to backup data that is backed up from a source volume(s) to a destination volume(s), a snapshot policy such that the data is associated with a snapshot, etc.), or some other type of storage policy.

In the above-described instances, a property of the data, a property of the volume, and/or an identification that the data is associated with a storage policy may be used to determine when to write the data to the second storage tier 408. The transfer data structure 419 is used to stage this data before it is sent to the second storage tier 408. Examples of how this type of mechanism may be implemented are described U.S. Pat. Nos. 10,489,073, 11,709,603, and 11,354,049, each of which is incorporated by reference herein in its entirety.

In some instances, however, it may be desirable to allow a client (e.g., client 418) to control when data (e.g., data 417)

associated with a request (e.g., request 416 that is a client write request) is directly written to the second storage tier 408. In other words, it may be desirable to have a third-party user, system, or device control when data for a specific volume is directly written to the second storage tier 408 while allowing the third-party user, system, or device to remain unaware or otherwise blind to the processes involved in storing that data on the second storage tier 408. Accordingly, the embodiments described herein provide a client-controllable bypass mechanism for directly writing to the second storage tier 408, as described below in Section III.B.

V. Client-Controllable Bypass Mechanism

With continuing reference to FIG. 4A, in various instances, it may be desirable to allow a client to dynamically control when data is written directly to the second storage tier 408. The client-controllable bypass mechanism described herein may also be referred to as a bypass write mode and is one that can be enabled and disabled by the client (e.g., client 418).

In one or more embodiments, the file system manager 415 may receive a request (e.g., request 416) from a client (e.g., client 418) for writing data 417 to a selected volume in set of volumes 413. The file system manager 415 may determine whether a bypass write mode has been enabled for the volume. The bypass write mode is a client-controllable bypass mode that allows bypassing writing of the data to any tiers (e.g., first storage tier 406) other than second storage tier 408. Specifically, when the bypass write mode is enabled for a volume, the volume sees only the data that is written directly to the second storage tier 408. The data is assigned a location identifier in a format used by the second storage tier 408 (e.g., the object based storage 412). While the data may be temporarily staged in the transfer data structure 419, the volume references the location identifier associated with the second storage tier 408 to access the data whether the data is in the transfer data structure 419 or has already been moved to the second storage tier 408.

A location identifier for the first storage tier 406 may include, for example, a physical volume block number (pvbn), a file block number, a virtual volume block number (vvbn), or other storage location format used by the first storage tier 406 to store and reference data. This location identifier may also be referred to as a first storage tier location identifier. A location identifier for the second storage tier 408 may include, for example, a physical volume block number (pvbn), a file block number, a virtual volume block number (vvbn), or other storage location format. This location identifier may also be referred to as a second storage tier location identifier.

For example, the data 417 associated with the request 416 may be stored in the transfer data structure 419 with a first storage tier location identifier. However, the data 417 may be assigned a second storage tier location identifier as the primary reference for the data 417. In some cases, the data 417 may need to be accessed before the data 417 has been sent to the second storage tier 408. For example, a read request for the data 417 may arrive before the data 417 has been sent to the second storage tier 408. In these instances, the file system manager 415 uses a mapping between the first storage tier location identifier and the second storage tier location identifier to access the data 417 within the transfer data structure 419.

The bypass write mode may be enabled for a volume in different ways. In one or more embodiments, a client may enable the bypass write mode for a volume by changing, e.g., a flag associated with the volume. The file system manager 415 may check this flag to determine whether the bypass write mode is enabled. The flag may be, for example, an attribute (e.g., a Boolean field) in a volume information data structure (e.g., volinfo data structure or volume information table) that indicates whether the bypass write mode is enabled (e.g., set to "true") or disabled (e.g., set to "false") for the volume.

When the file system manager 415 determines that the bypass write mode is enabled, the file system manager 415 may then determine whether space is available in the transfer data structure 419 for the set of objects 420 corresponding to the data 417 to be written. When space is available in the transfer data structure 419, then the set of objects 420 can be assembled using the data 417, with the data 417 being temporarily staged in the transfer data structure 419 until the set of objects 420 can be generated in memory and the data 417 transferred to the second storage tier 408 in the manner described above in Section III.A.

In one or more embodiments, the file system manager 415 includes a throttling system 422 that helps manage space and throughput with respect to the transfer data structure 419. For example, the throttling system 422 may be used to monitor a set of parameters 424 associated with the transfer data structure 419. The throttling system 422 uses the set of parameters 424 and a plurality of thresholds 426 to determine when to start and/or stop throttling incoming requests at the frontend of the transfer data structure and/or when to start and/or stop the transfer of data out of the transfer data structure 419.

In some embodiments, the throttling system 422 may be used to throttle only those requests that are part of the client-controllable bypass mechanism (e.g., requests to write data to volumes for which the bypass write mode has been enabled). In other embodiments, the throttling system 422 may be used for throttling other types of requests. Throttling system 422 is described in greater detail in Section III.C below with respect to FIG. 4B.

VI. Throttling System

FIG. 4B is another schematic diagram of throttling system 422 of the system 400 depicted in accordance with one or more embodiments. In FIG. 4B, throttling system 422 monitors the set of parameters 424 and uses the values for the set of parameters 424 and the plurality of thresholds 426 to determine when to initiate throttling and when to stop throttling. The plurality of thresholds 426 may include, for example, a start throttle threshold 432 and a stop throttle threshold 434.

Throttling may include slowing down the rate at which data is written to the transfer data structure 419 to ensure that the transfer data structure 419 does reach capacity faster than the transfer data structure 419 can drain (e.g., have data sent to the second storage tier 408), which could cause reduced performance.

The set of parameters 424 may include, for example, transfer data structure usage 428, object based storage usage 430, dynamic drain rate 431, and/or other types of counters or measurement parameters with respect to transfer data structure 419 and/or the object based storage 412. Transfer data structure usage 428 may be a parameter for an amount (e.g., percentage) of space used space used (e.g., currently in use or otherwise not free for staging) within transfer data structure 419. Object based storage usage 430 may be a parameter for, for example, a number of data blocks that have been written to object based storage 412.

Dynamic drain rate 431 may be a computed rate measuring how quickly the transfer data structure 419 is draining (e.g., blocks are being freed for use due to objects being sent to object based storage 412). The dynamic drain rate 431 may be computed in various ways. In one or more embodiments, the dynamic drain rate 431 may be measured continuously, substantially continuously, or periodically with respect a particular time period (or interval).

In one or more embodiments, the dynamic drain rate 431 may be computed as a moving average. For example, the set of parameters 424 may further include a calculation time period (e.g., 1 millisecond, 5 milliseconds, 100 milliseconds, or some other value between about 0.5 milliseconds and 2 minutes) and a total time period (e.g., 10 seconds, 20 seconds, 30 seconds, or some other value selected between about 50 milliseconds and 5 minutes). The dynamic drain rate 431 may be computed as a moving average over the total time period, averaging the drain rate computed for each calculation time period within the total time period. In other embodiments, the set of parameters may include some other type of drain rate parameter that indicates the rate at which objects are being sent from the transfer data structure 419 to the second storage tier 408. Drain rate may also be referred to as a backend rate, backend drain rate, backend drain throughput (or TLOG drain throughput).

The start throttle threshold 432 is a threshold used to determine when to start throttling the data going into the transfer data structure 419. The start throttle threshold 432 may be set to a value of about 60%. In some cases, the start throttle threshold 432 may be a value selected between about 51% and about 85%. The stop throttle threshold 434 is a threshold used to determine when to stop throttling the data going into the transfer data structure 419. The stop throttle threshold 434 may be set to a value of about 50%. In some cases, the stop throttle threshold 434 may be a value selected between about 35% and about 60%.

In one or more embodiments, the set of parameters 424 further includes an incoming bypass traffic measurement 435. The incoming bypass traffic measurement 435 may be, for example, a measurement of the amount (e.g., percentage) of incoming requests at the transfer data structure 419 that are associated with volumes for which the bypass write mode has been enabled. In other words, the incoming bypass traffic measurement 435 indicates the percentage of requests that belong to the bypass write mode-enabled volumes on a node.

Throttling system 422 may use the incoming bypass traffic measurement 435 to determine how and when to implement a drain throttle control 436 for a backend of the transfer data structure 419. The drain throttle control 436 may be a rate at which the outgoing traffic is to be throttled. For example, the drain throttle control 436 may be the maximum rate set drain throughput from the transfer data structure 419 (e.g., transferring out of data in data blocks and the freeing of those data blocks for use. The drain throttle control 436 may be set to a default value between about 75% and about 98% and can be then increased or reduced as needed. In some cases, the drain throttle control 436 is not a particular percentage or rate but rather, an algorithm for throttling that can be changed or adjusted based on incoming bypass traffic measurement 435.

For example, if the incoming bypass traffic measurement 435 indicates that the only incoming write traffic are requests associated with one or more volumes for which the bypass write mode has been enabled, the drain throttle control 436 may be set to an increased rate or fully disabled in order to allow for more efficient draining of the transfer data structure 419. In this manner, the amount of throttling may be reduced, or throttling may be halted.

In one or more embodiments, throttling system 422 may determine whether incoming bypass traffic measurement 435 indicates high bypass traffic (e.g., above 50%), medium bypass traffic (e.g., about 20%-50%), or low bypass traffic (e.g., below 20%). For high bypass traffic, the drain throttle control 436 may be adjusted to reduce throttling or disable throttling to ensure high performance throughput from the transfer data structure 419. For low bypass traffic, the drain throttle control 436 may be adjusted to increase throttling (e.g., to conserve computing resources and or account for slow write operations to the second storage tier 408). For medium bypass traffic, the drain throttle control 436 may be adjusted to restrict the drain rate to a maximum allowed drain rate (e.g., between about 70% and about 98%).

In one or more embodiments, the throttling system 422 acts as a gatekeeper for any requests with data that is to be staged in the transfer data structure 419. For example, when a request 416 is received with data 417 that is to be written to the transfer data structure 419, the throttling system 422 may determine whether the transfer data structure usage 428 (e.g., an amount of storage space used in the transfer data structure) exceeds the start throttle threshold 432. If the transfer data structure usage 428 does not exceed (or is not at or above) the start throttle threshold 432, the request 416 is processed in the order it is received without throttling and the data 417 is staged in the transfer data structure 419.

If the transfer data structure usage 428 exceeds (or is at or above) the start throttle threshold 432, the throttling system 422 may then send the request 416 into a queue from a set of throttling queues 438. The requests in each queue of the set of throttling queues 438 are handled in a first in, first out (FIFO) order.

In one or more embodiments, the set of throttling queues 438 includes one or more per-aggregate queues and the request 416 may be enqueued on a corresponding per-aggregate queue to help ensure the incoming order (e.g., FIFO order) of the requests in the queue. The throttling system 422 may also monitor and record the size of data associated with each request that is received and enqueued, as well as the total amount of write space enqueued overall.

In one or more embodiments, the set of throttling queues 438 may include, for example, a normal queue 440 and one or more priority queues (e.g., a high priority queue 442). The normal queue 440 may be processed at a slower rate than the high priority queue 442 and this slower processing of the normal queue 440 may be implemented in a number of different ways. For example, a first amount of space within the transfer data structure 419 may be designated for processing requests in the normal queue 440 and a second amount of space within the transfer data structure 419 may be designated for processing requests in the high priority queue 442, where the second amount of space is greater than the first amount of space. The ratio between the first amount of space and the second amount of space may be selected as, for example, 20:80. In other cases, the ratio may be one selected from a range of possibilities between about 5:95 and about 40:60.

In addition to the requests in a queue in the set of throttling queues 438 are processed based on a priority type (e.g., normal or high-priority) of the queue, as well as a dynamic throttle rate 444. In some cases, dynamic throttle rate 444 may be considered one of set of parameters 424. The dynamic throttle rate 444 is a measure of the rate at which incoming data should be substantially allowed to be written to the transfer data structure 419. The throttling system 422 may identify the dynamic throttle rate 444 in various ways.

In one or more embodiments, the dynamic throttle rate 444 is identified based on the dynamic drain rate 431 described above. For example, the dynamic throttle rate 444 may be set to value that is equal to or substantially equal to the dynamic drain rate 431. In some cases, the dynamic throttle rate 444 may be set to value that is slower than the dynamic drain rate 431 by a predetermined amount. For example, the dynamic throttle rate 444 may be set to a rate that is 1%, 2%, 3%, 4%, 5%, etc. (e.g., a value between about 1% and about 20%) slower than the dynamic drain rate 431. In some cases, the dynamic throttle rate 444 may be set to a value that ensures that the dynamic throttle rate 444 does not exceed the dynamic drain rate 431 more than desired (e.g., exceed more than by a selected threshold such as 0%, 1%, 2%, 5%, 10%, or some other percentage between about 0% and 25%).

In one or more embodiments, the throttling system 422 may use the dynamic drain rate 431 to determine that a certain amount of space has been freed up within a certain time interval (e.g., 10 data blocks freed in 2 seconds). The throttling system 422 may adjust the dynamic throttle rate 444 to permit a same or similar amount of space to be filled up with data within the same or similar time interval.

In this manner, the throttling system 422 is able to manage both the frontend rate (e.g., dynamic throttle rate 444) being written into the transfer data structure 419 as well as the backend rate (e.g., dynamic drain rate 431) of data being sent out of the transfer data structure 419. The throttling system 422 may manage the transfer data structure 419 such that it does not fill up entirely at any given point in time. By managing the frontend rates (or throughput) into and the backend rates (or throughput) out of the transfer data structure 419, overall performance may be improved.

The throttling system 422 monitors the transfer data structure usage 428 to determine when the transfer data structure usage 428 threshold falls below (or reaches at or below) the stop throttle threshold 434. When the transfer data structure usage 428 falls below (or reaches at or below) the stop throttle threshold 434, throttling is halted and any remaining requests in the set of throttling queues 438 are processed according to the FIFO order. For example, the requests may be awoken (or restarted) and allowed to proceed. In some cases, the requests may still be processed according to the ratio determined for the set of throttling queues 438 according to the FIFO order. In other cases, the requests may be processed without any restrictions according to the FIFO order, regardless which queue priority type.

In some cases, the throttling system 422 may designate that one set of sources should be throttled, while another set of sources should not. In such cases, a request (e.g., request 416) received from a source that has been designated as being subject to throttling when throttling is active may be sent into the set of throttling queues when throttling is active. When the request is received from a source that has not been designated as being subject to throttling when throttling is active may be processed without any throttling.

In some embodiments, the throttling system 422 may include a separate procedure for periodically waking up a set of write requests periodically (e.g., at an interval between about 5 ms and 25 ms) that match the storage space that has been freed within the same period/interval. In this manner, as space is freed within the transfer data structure 419, write requests that have been enqueued may be allowed to take up that space.

In some cases, for any write requests that have been enqueued for a period of time longer than a selected amount of time (e.g., about 10 seconds or another time selected between about 5 seconds to about 20 seconds), then those write requests may be awoken and a corresponding error message sent. In some cases, the error message is a retriable error message that allows the source (e.g., client 418) to retry the request.

The above description of the throttling system 422 may describe various examples of how the throttling system 422 may be implemented. In other embodiments, throttling system 422 may be implemented in one or more other ways to ensure the desired level of performance for the transfer data structure 419 and to ensure that the transfer data structure 419 does not fill up or reach/exceed storage capacity faster than the transfer data structure 419 can drain or otherwise send data to the second storage tier 408.

VII. Exemplary Methodologies for Write Allocation in a Multi-Tier Storage Environment FIG. 5 is a flowchart diagram of a process 500 for performing selective write allocation in accordance with one or more embodiments. The process 500 may be implemented by one or more processors executing computer-readable instructions (e.g., from one or more computer-readable media) to perform the functions described herein. The process 500 may be implemented using one or more processors in a node in a cluster such as, for example, first node 130, second node 132, or third node 134 in FIG. 1. In some cases, the process 500 may be implemented by one or more processors of a data storage apparatus, such as, for example, one of the data storage apparatuses 202(1)-202(n) described in connection with FIG. 2. In one or more embodiments, the process 500 may be implemented by one or more processors of a data storage device (e.g., data storage system 300 in FIG. 3) or a storage system (e.g., storage system 402 of system 400 in FIG. 4A). Further, the process 500 may be implemented using a file system manager such as, for example, file system manager 415 described with respect to FIGS. 4A-4B.

Operation 502 includes receiving, from a client, a write request to write data to a volume. The volume may be, for example, a volume in set of volumes 413 in FIGS. 4A-4B. The written request may be managed by, for example, file system manager 415 in FIGS. 4A-4B. The volume may represent both storage (e.g., physical storage) within a first storage tier (e.g., first storage tier 406 in FIGS. 4A-4B) and storage (e.g., object based storage) within a second storage tier (e.g., second storage tier 408 in FIGS. 4A-4B). The first storage tier may be, for example, a performance storage tier and the second storage tier may be, for example, a capacity storage tier.

Operation 504 includes determining that a bypass write mode is enabled for the volume in which the bypass write mode allows directly assigning the data to the second storage tier. For example, the bypass write mode may be client-controllable in that the client can control when to enable and disable the volume.

When the bypass write mode is enabled, the data may be temporarily staged in a transfer data structure (e.g., a staging file) in the first storage tier and a mapping may be used to map the location identifier for the location of the data in the transfer data structure to a location identifier for a location in the second storage tier assigned for the data. This location identifier in the second storage tier will be used as the primary reference for the data. More specifically, the bypass write mode allows directly assigning a location identifier for the second storage tier as a primary reference for the data and bypassing providing a location identifier for the first storage tier as the primary reference for the data to the volume or the client. In this manner, once the data is ultimately written to the second storage tier, there is no need to update the primary reference for the data provided to the volume of the file system because the volume already sees the primary reference for the data as the location identifier for the second storage tier and does not see that the data ever was staged in the first storage tier.

Accordingly, what the file system (e.g., volume) and the client sees are simplified. When the bypass write mode is enabled, the volume is configured such that "writing" of the data bypasses direct writing onto the physical storage (e.g., physical storage 410 of the first storage tier 406) and is directed to be written to object based storage (e.g., object based storage 412 of the second storage tier 408).

The determination in operation 504 may be made by determining whether, for example, a flag associated with the volume indicates that the bypass write mode has been enabled. In some embodiments, the flag takes the form of an on-disk flag. For example, the flag may be an attribute in the volume information (volinfo or vinfo) data structure of the volume that indicates whether the bypass write mode has been enabled.

Operation 506 includes determining that space is available in a transfer data structure in the first storage tier. The transfer data structure may be, for example, the transfer data structure 419 in FIGS. 4A-4B. The transfer data structure, which may also be referred to as a transfer log (e.g., TLOG), may reside in a portion of the first storage tier. For example, the transfer data structure may reside in an aggregate associated with the physical storage 410 of the first storage tier 406 in FIGS. 4A-4B.

Operation 508 includes building a set of objects for the data in which the data is stored in the transfer data structure in the first storage tier. Storing the data in the transfer data structure (e.g., transfer data structure 419 in FIGS. 4A-4B) buffers or otherwise temporarily stages the data in the transfer data structure. The set of objects may include, for example, at least one of a new object that is newly built for the data or an object that is already in the progress of being a built but that has yet to be filled up but that is filled or further partially filled using the data.

Building an object may include allocating a first set of data blocks (e.g., location blocks or data block identifiers) for an object in the transfer data structure, as well as allocating a second set of data blocks (e.g., location blocks or data block identifiers) for the object. Building the object may further include adding this information and/or other information about the object to an object staging data structure as described above in Section III.

Operation 510 includes sending the set of objects, which includes the data in the transfer data structure, to the second storage tier. In one or more embodiments, the set of objects may be sent as a batch to the second storage tier when all objects in the set of objects are made available for transfer (e.g., sufficient data has been stored for each object). In other embodiments, each object in the set of objects may be individually transferred to the second storage tier when that object becomes ready and available for transfer. The object may be made "available" when sufficient data has been stored in the object or when sufficient data has been stored. In one or more embodiments, operation 512 may include or the process 500 may include, prior to performing operation 512, for each object to be transferred, performing the step of generating the object in memory using the corresponding data in the transfer data structure and an object metafile.

Process 500 may optionally include operation 512, which includes freeing data blocks in the transfer data structure used for the set of objects for future use after the set of objects is sent to the second storage tier. Freeing the data blocks may also be referred to as "draining" the transfer data structure. In one or more embodiments, operation 512 may be performed in accordance with how the set of objects is transferred. For example, if the set of objects is transferred in batch mode, the data blocks corresponding to the set of objects may be freed together. If, however, the set of objects is transferred with each object being transferred individually when made available, then the corresponding data blocks for each object may be freed after each individual transfer.

FIG. 6 is a flowchart diagram of a process 600 for managing data flowing through a transfer data structure in accordance with one or more embodiments. The process 600 may be implemented by one or more processors executing computer-readable instructions (e.g., from one or more computer-readable media) to perform the functions described herein. The process 600 may be implemented using one or more processors in a node in a cluster such as, for example, first node 130, second node 132, or third node 134 in FIG. 1. In some cases, the process 600 may be implemented by one or more processors of a data storage apparatus, such as, for example, one of the data storage apparatuses 202(1)-202(n) described in connection with FIG. 2. In one or more embodiments, the process 600 may be implemented by one or more processors of a data storage device (e.g., data storage system 300 in FIG. 3) or a storage system (e.g., storage system 402 of system 400 in FIGS. 4A-4B). Further, the process 600 may be implemented using a file system manager such as, for example, file system manager 415 described with respect to FIGS. 4A-4B.

Operation 602 includes monitoring a set of parameters associated with a transfer data structure to monitor data flowing through a transfer data structure in a first storage tier to a second storage tier. Monitoring the data flowing through the transfer data structure includes monitoring the incoming data that is written to the transfer data structure and the outgoing data that is transferred out of the transfer data structure to the second storage tier. The transfer data structure may be, for example, transfer data structure 419 in FIGS. 4A-4B.

The set of parameters may include, for example, without limitation, various counters or measurement parameters such as set of parameters 424 in FIG. 4A. The set of parameters may include, for example, a transfer data structure usage, an object based storage usage, a dynamic drain rate, and/or other types of counters or measurement parameters with respect to the transfer data structure and/or the object based storage in the second storage tier. The transfer data structure usage may be a parameter for an amount (e.g., percentage) of space used space used (e.g., currently in use or otherwise not free for staging) within the transfer data structure. The object based storage usage may be a parameter for, for example, a number of data blocks that have been written to the object based storage in the second storage tier.

The dynamic drain rate may be a computed rate measuring how quickly the transfer data structure is draining (e.g., blocks are being freed for use due to objects being sent to object based storage 412). The dynamic drain rate may be computed in various ways. In one or more embodiments, the dynamic drain rate may be measured continuously, substantially continuously, or periodically with respect a particular time period (or interval).

In one or more embodiments, the dynamic drain rate may be computed as a moving average. For example, the set of parameters may further include a calculation time period (e.g., 1 millisecond, 5 milliseconds, 100 milliseconds, or some other value between about 0.5 milliseconds and 2 minutes) and a total time period (e.g., 10 seconds, 20 seconds, 30 seconds, or some other value selected between about 50 milliseconds and 5 minutes). The dynamic drain rate may be computed as a moving average over the total time period, averaging the drain rate computed for each calculation time period within the total time period. In other embodiments, the set of parameters may include some other type of drain rate parameter that indicates the rate at which objects are being sent from the transfer data structure to the second storage tier.

In some cases, the set of parameters includes an indication of the type of data traffic that is being received at the transfer data structure. For example, a parameter may indicate what percentage of the data within a selected time period is associated with the bypass write mode.

Operation 604 includes initiating throttling of incoming data into the transfer data structure when an amount of space used within the transfer data structure exceeds (or is at or above) a start throttle threshold (e.g., start throttle threshold 432 in FIG. 4B). Throttling the incoming data includes reducing the rate at which the data may be written to the transfer data structure. The start throttle threshold is a threshold used to determine when to start throttling the data going into the transfer data structure. The start throttle threshold may be set to a value of about 60%. In some cases, the start throttle threshold may be a value selected between about 51% and about 85%.

Operation 606 includes halting throttling of incoming data into the transfer data structure when the amount of space used within the transfer data structure falls below (or reaches or is below) a stop throttle threshold (e.g., stop throttle threshold 434 in FIG. 4B). The stop throttle threshold is a threshold used to determine when to stop throttling the data going into the transfer data structure. The stop throttle threshold may be set to a value of about 50%. In some cases, the stop throttle threshold may be a value selected between about 35% and about 60%.

Operation 608 includes adjusting a drain throttle control for controlling a rate at which the transfer data structure is draining when a set of criteria is met. The set of criteria may include, for example, a determination that the system has only object based storage write traffic and no other types of write traffic incoming. The drain throttle control may be, for example, disabled to allow maximum drain throughput, may be set to a maximum drain rate (e.g., a value between about 75% and about 98%), or may be allowed to fluctuate with throttling as described herein. The drain throttle control, which may be, for example, drain throttle control 436 in FIG. 4B, may allow for more efficient draining of the transfer data structure.

The example methodologies described above allow a mechanism for quickly, efficiently, and easily writing data to object based storage in a second storage tier (e.g., capacity storage tier) without needing to first assign the data to physical storage in the first storage tier (e.g., performance storage tier). Thus, "writing" to the performance tier may be bypassed (as far as the volume and the client are considered), thereby reducing undesirable delays in being able to quickly ingest large amounts of data for storage in object based storage.

Figure 7A:
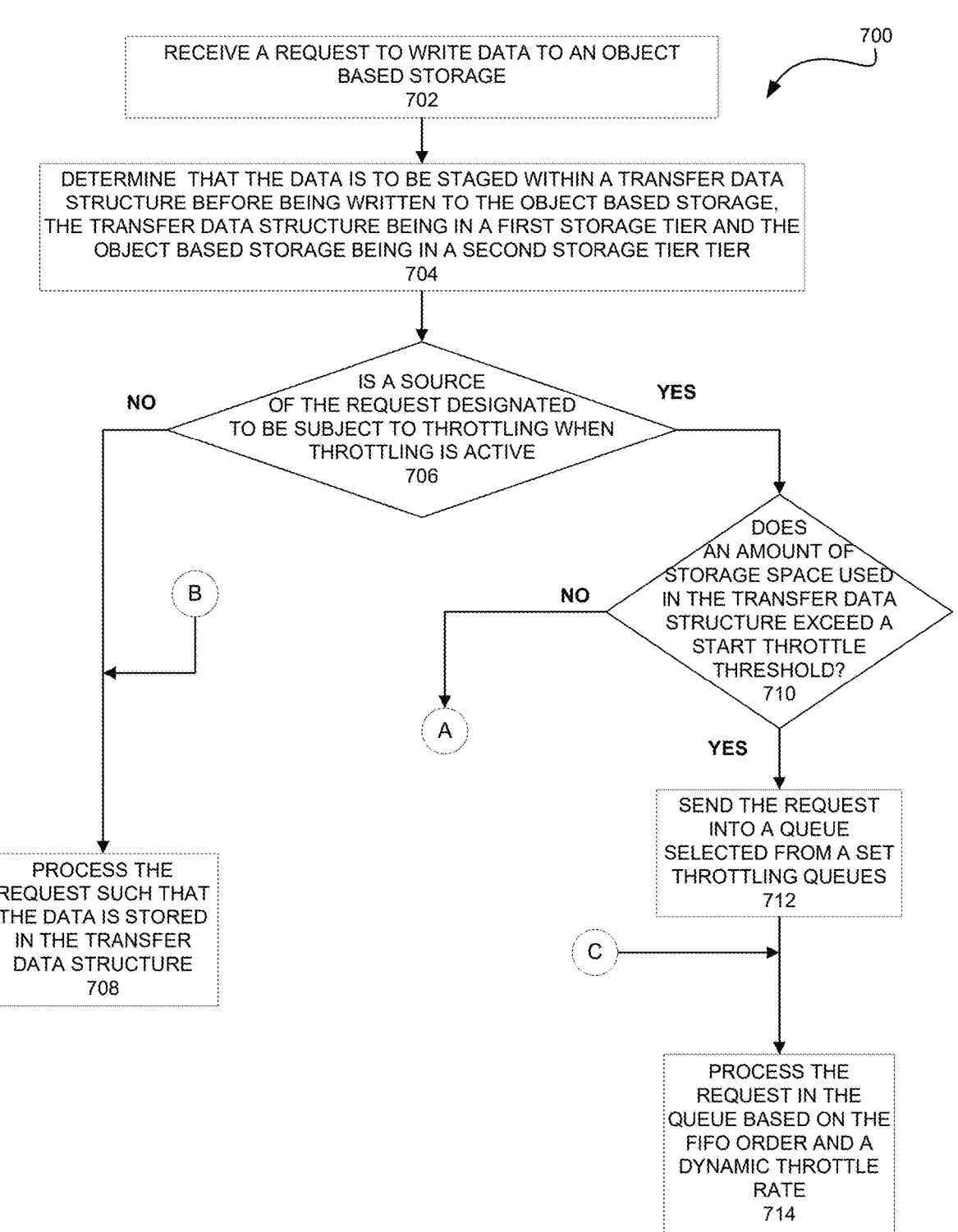
FIGS. 7A-7B are together a flowchart diagram of a process for managing data flowing through a transfer data structure in accordance with one or more embodiments.
Figure 7B:
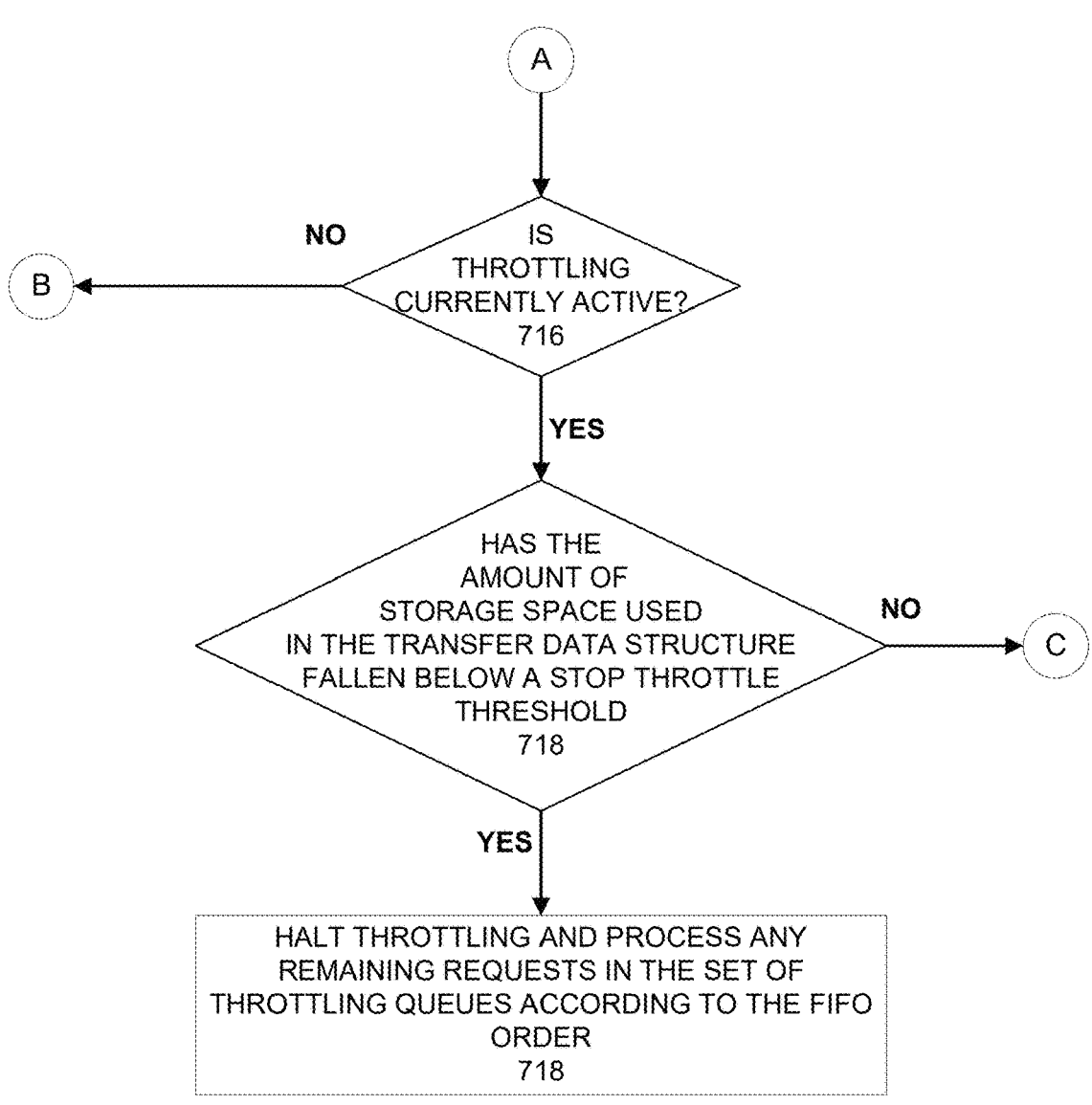

FIGS. 7A-7B are together a flowchart diagram of a process 700 for managing data flowing through a transfer data structure in accordance with one or more embodiments. The process 700 may be implemented by one or more processors executing computer-readable instructions (e.g., from one or more computer-readable media) to perform the functions described herein. The process 700 may be implemented using one or more processors in a node in a cluster such as, for example, first node 130, second node 132, or third node 134 in FIG. 1. In some cases, the process 700 may be implemented by one or more processors of a data storage apparatus, such as, for example, one of the data storage apparatuses 202(1)-202(n) described in connection with FIG. 2. In one or more embodiments, the process 700 may be implemented by one or more processors of a data storage device (e.g., data storage system 300 in FIG. 3) or a storage system (e.g., storage system 402 of system 400 in FIGS. 4A-4B).

Further, the process 700 may be implemented using a file system manager such as, for example, file system manager 415 described with respect to FIGS. 4A-4B. Still further, the process 700 may be implemented using throttling system 422 described with respect to FIGS. 4A-4B.

Operation 702 includes receiving a request to write data to an object based storage. The request may be, for example, the request 416 described with respect to FIGS. 4A-4B. The data may be, for example, the data 417 described with respect to FIGS. 4A-4B. The object based storage in the remote storage tier may be one example of an implementation for the object based storage 412 in the second storage tier 408 described with respect to FIGS. 4A-4B. The request may be to write data to a volume. The volume may be a composite aggregate that is associated with both the object based storage of the remote storage tier and physical storage of a local storage tier. The physical storage of the local storage tier may be, for example, physical storage 410 of the first storage tier 406 described with respect to FIGS. 4A-4B.

The request may be received from a source that may be a client (e.g., client 418 in FIG. 4A) or one or more software-based processes. As previously discussed, a software-based process that may be a "source" may be comprised of, for example, without limitation, at least one of an application, a process internal to or otherwise associated with storage system 402, a background process, a third-party process, a piece of code, a model, an algorithm, a policy-based process (e.g., a series of steps or functions implemented based on a policy), or some other type of software-based process.

Operation 704 includes determining that the data is to be staged within a transfer data structure before being written to the object based storage, the transfer data structure being in a first storage tier (e.g., a performance storage tier) and the object based storage being in a second storage tier (e.g., a capacity storage tier). The transfer data structure may be, for example, transfer data structure 419 described with respect to FIGS. 4A-4B. By staging the data in the transfer data structure, large amounts of data can be ingested at the level of the first storage tier (e.g., taking advantage of the performance capabilities of the first storage tier) even though the data is ultimately destined to be written to the second storage tier. This type of staging improves overall performance.

The process 700 may optionally include operation 706. Operation 706 includes determining whether a source of the request is designated to be subject to throttling when throttling is active. If the source of the request is not designated to be subject to throttling when throttling is active, the process 700 proceeds to operation 708. For example, the requests from certain sources (e.g., software-based processes) that do not frequently send data to be written to the second storage tier may be allowed to be processed without throttling.

Operation 708 includes processing the request such that the data is stored in the transfer data structure. Operation 708 may include, for example, writing the data to a set of data blocks in the transfer data structure. The set of data blocks may be associated with a particular object and the object may be associated with a particular location in the object based storage. Specifically, the data is assigned a location identifier in the object based storage while also being written/held in a location with a different location identifier in the physical storage. The location identifier for the physical storage is mapped to the location identifier for the object based storage. Staging the data in the transfer data structure in this way bypasses the volume needing to be aware that the data was temporarily held in the transfer data structure and then having to update the location assignment to reflect that the data is to be transferred to the object based storage. The volume (and file system) see only that the data is assigned to the object based storage.

With reference again to operation 706, if the source of the request is designated to be subject to throttling when throttling is active, the process 700 proceeds to operation 710 described below. Operation 706 may be optional, and, accordingly, in other embodiments, the source designation may not be taken into account. In these embodiments, after operation 704, the process 700 would proceed directly to operation 710 described below.

Operation 710 includes determining whether an amount of storage space used in the transfer data structure exceeds (or is at or above) a start throttle threshold (e.g., start throttle threshold 432 in FIG. 4B). For example, a parameter such as transfer data structure usage 428 in FIG. 4B may be used as a measure of the amount of storage space used (e.g., filled up) in the transfer data structure. If the amount of storage space used in the transfer data structure exceeds (or is at or above) the start throttle threshold, the process proceeds to operation 712.

Operation 712 includes sending the request into a queue selected from a set throttling queues. The set of throttling queues may be, for example, the set of throttling queues 438 described with respect to FIG. 4B. Requests in the queue are handled in a first in, first out (FIFO) order.

In one or more embodiments, the set of throttling queues 438 includes one or more per-aggregate queues and the request may be enqueued on a corresponding per-aggregate queue to help ensure the incoming order (e.g., FIFO order) of the requests in the queue. In some embodiments, the set of throttling queues includes, for example, a normal queue and one or more priority queues (e.g., low priority queue, high-priority queue, urgent priority queue, etc.).

For example, the set of throttling queues may include a normal queue and a high priority queue, where the normal queue is processed at a slower rate than the high priority queue. As one example, a first amount of space within the transfer data structure may be designated for processing requests in the normal queue and a second amount of space within the transfer data structure may be designated for processing requests in the high priority queue 442, where the second amount of space is greater than the first amount of space. The ratio between the first amount of space (e.g., for the normal queue) and the second amount of space (e.g., for the high-priority queue) may be selected as, for example, 20:80. In other cases, the ratio may be one selected from a range of possibilities between about 5:95 and about 40:60.

Operation 714 includes processing the request in the queue based on the FIFO order and a dynamic throttle rate. The dynamic throttle rate is a rate at which data is allowed to be written to the transfer data structure. The dynamic throttle rate is dynamic because it may be adjusted continuously or periodically to account for changes in a dynamic drain rate. The dynamic drain rate may be a measure of the rate at which data is being sent out of the transfer data structure and into the object based storage.

With reference again to operation 710, if the amount of storage space used in the transfer data structure does not exceed (or is not at or above) the start throttle threshold, the process 700 proceeds to operation 716 (FIG. 7B) described below.

Operation 716 includes determining whether throttling is currently active. Throttling may be considered currently active when one or more requests are enqueued in the set of throttling queues or the set of throttling queues are at least available for requests to be enqueued.

If throttling is not currently active, the process 700 proceeds to operation 708 as described above (FIG. 7A). Otherwise, if throttling is currently active, the process 700 proceeds to operation 718 described below.

Operation 718 includes determining whether the amount of storage space used in the transfer data structure has fallen below (or is at or below) a stop throttle threshold (e.g., stop throttle threshold 434). If the amount of storage space used in the transfer data structure has not fallen below (or is at or below) the stop throttle threshold, then the process 700 proceeds to operation 714 as described above. If, however, the amount of storage space used in the transfer data structure has fallen below (or is at or below) the stop throttle threshold, the process 700 proceeds to operation 720 described below.

Operation 720 includes halting throttling and processing any remaining requests in the set of throttling queues according to the FIFO order. When throttling has been halted and is thus no longer active, all enqueued requests may be processed in the order they were received. Further, all new incoming requests may be processed without being sent into a throttling queue.

FIG. 8 is a flowchart diagram of a process 800 for managing backend throttling for a transfer data structure in accordance with one or more embodiments. The process 800 may be implemented by one or more processors executing computer-readable instructions (e.g., from one or more computer-readable media) to perform the functions described herein. The process 800 may be implemented using one or more processors in a node in a cluster such as, for example, first node 130, second node 132, or third node 134 in FIG. 1. In some cases, the process 800 may be implemented by one or more processors of a data storage apparatus, such as, for example, one of the data storage apparatuses 202(1)-202(n) described in connection with FIG. 2. In one or more embodiments, the process 800 may be implemented by one or more processors of a data storage device (e.g., data storage system 300 in FIG. 3) or a storage system (e.g., storage system 402 of system 400 in FIGS. 4A-4B).

Further, the process 800 may be implemented using a file system manager such as, for example, file system manager 415 described with respect to FIGS. 4A-4B. Still further, the process 700 may be implemented using throttling system 422 described with respect to FIGS. 4A-4B.

Operation 802 includes computing an incoming bypass traffic measurement. Bypass traffic relates to the number of requests received for writing data to volumes for which the bypass write mode has been enabled. Thus, the incoming bypass traffic measurement may be, for example, a measurement of the amount (e.g., percentage) of incoming requests at the transfer data structure that are associated with volumes for which the bypass write mode has been enabled. In other words, the incoming bypass traffic measurement indicates the percentage of requests that belong to the bypass write mode-enabled volumes on a node.

Operation 804 includes determining whether the incoming bypass traffic measurement is within a first range, a second range, or a third range. The first range, the second range, and the third range may be, for example, ranges associated with high bypass traffic, medium bypass traffic, and low bypass traffic, respectively. In one or more embodiments, the first range may be, for example, a percentage above about 50%. The second range may be, for example, between about 20% to about 50%. The third range may be, for example, below about 20%. Of course, in other embodiments, these percentages are adjustable. The three ranges could be, for example, above 60%, between 30%-60%, and below 30%. As yet another example, the ranges could be above 45%, between 15-45%, and below 15%.

If the incoming bypass traffic measurement is within the first range (e.g., high bypass traffic), the process 800 may perform operation 806, which includes adjusting a drain throttle control to reduce or disable throttling of outgoing data. The drain throttle control may be, for example, a throttling rate that can be reduced to limit throttling or a control that can be disabled to prevent throttling.

If the incoming bypass traffic measurement is within the second range (e.g., medium bypass traffic), the process 800 may perform operation 808. Operation 808 includes adjusting the drain throttle control to set the maximum allowed drain rate for the transfer data structure to a value below 100%. For example, the maximum allowed drain rate may be set to a value between about 70% and about 98%.

If the incoming bypass traffic measurement is within the third range (e.g., low bypass traffic), the process 800 may perform operation 810. Operation 810 includes performing dynamic throttling in which throttling is increased as compared to the throttling performed for the first range and the second range.

In this manner, the throttling performed for the second range of incoming bypass traffic may be a at a level between the levels of throttling performed for the first range and third range of incoming bypass traffic. In other words, the throttling system may help ensure that, for a given maximum/overall throughput on a node when there is only data traffic being sent directly to the capacity storage tier, throttling is minimal or disabled; for a given maximum/overall throughput on a node when there is no data traffic being sent directly to the capacity storage tier, throttling may be increased (e.g., to conserve computing resources); and for a given maximum/overall throughput on a node when there is mixed traffic, throttling is performed at a level between the previous two levels. In this manner, a significant drop in performance is not seen with the mixed traffic.

Thus, the throttling system described herein in FIGS. 4A-4B as well as in the flowchart diagrams of FIGS. 7A-7B and 8 may help integrate volumes for which the bypass write mode has been enabled with the rest of the processes and/or features associated with the storage system (e.g., implemented using ONTAP™ storage operating system) such that the resource distribution is fair across the various consumers of the transfer data structure. Further, the throttling system may help ensure that performance does not drop more than desired due to transfer data structure space management issues or that performance is improved. Performance may be evaluated using various parameters including transfer (e.g., PUT) performance for the transfer data structure for individual consumers of the transfer data structure (e.g., throughput performance with respect to data being transferred to the object based storage of the capacity storage tier).

VIII. Additional Considerations

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The headers and subheaders between sections and subsections of this document are included solely for the purpose of improving readability and do not imply that features cannot be combined across sections and subsection. Accordingly, sections and subsections do not describe separate embodiments.

The terms and expressions which have been employed are used as terms of description and not of limitation, and there is no intention in the use of such terms and expressions of excluding any equivalents of the features shown and described or portions thereof, but it is recognized that various modifications are possible within the scope of what is claimed. Thus, it should be understood that although one or more inventions have been specifically disclosed by the embodiments and optional features described herein, modification and variation of the concepts disclosed herein may be resorted to by those skilled in the art, and that such modifications and variations are considered to be within the scope of the one or more inventions described herein and the invention described in the appended claims.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The description provides preferred exemplary embodiments only, and is not intended to limit the scope, applicability, or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

The present embodiments may be implemented using hardware, software, firmware, or a combination thereof. Accordingly, it is understood that any operation of the computing systems described herein may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM. For example, computer executable components may be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Further, the terms "component", "module", "system," and the like may refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer. As another example, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method implemented by a processor executing instructions out of a memory for a storage operating system, the method comprising:

receiving a request to write data to an object based storage;

determining that the data is to be staged within a transfer data structure before being written to the object based storage, wherein the transfer data structure is in a first storage tier and the object based storage is in a second storage tier;

determining that an amount of storage space used in the transfer data structure exceeds a start throttle threshold;

sending, in response to a determination the amount of storage space used exceeds the start throttle threshold, the request into a queue selected from a set of throttling queues, wherein requests in the queue are handled in a first in, first out (FIFO) order;

processing the request in the queue based on the FIFO order and a dynamic throttle rate; and adjusting a drain throttle rate at which the data is transferred out of the transfer data structure based on whether the data to be written is first stored in a physical storage in the first storage tier separate from the transfer data structure.

2. The method of claim 1, further comprising:

halting throttling in response to determining that the amount of storage space used in the transfer data structure has fallen below a stop throttle threshold; and processing any remaining requests in the set of throttling queues according to the FIFO order.

3. The method of claim 1, wherein the set of throttling queues includes a normal queue and a high priority queue and wherein the normal queue is processed at a slower rate than the high priority queue.

4. The method of claim 1, wherein the set of throttling queues includes a normal queue and a high priority queue; wherein a first amount of space within the transfer data structure is designated for processing requests in the normal queue and a second amount of space within the transfer data structure is designated for processing requests in the high priority queue; and wherein the second amount of space is greater than the first amount of space.

5. The method of claim 1, further comprising:

determining that a source of the data is one of a set of sources designated as being subject to throttling prior to sending the request into the queue selected from the set of throttling queues.

6. The method of claim 1, further comprising:

computing a dynamic drain rate for the transfer data structure; and identifying the dynamic throttle rate based on the dynamic drain rate.

7. The method of claim 1, wherein processing the request comprises:

processing the request in the queue based on the FIFO order, the dynamic throttle rate, and a priority type of the queue.

8. The method of claim 1, wherein the request is a write request received from a client.

9. The method of claim 1, wherein, prior to be written to the transfer data structure, the data is stored in the physical storage in the first storage tier and the object based storage comprises a cloud storage.

10. The method of claim 1, wherein the request is received from a software-based process that comprises at least one of an application, a process internal to the storage operating system, a process associated with the storage operating system, a third-party process, a piece of code, a model, an algorithm, or a policy-based process.

11. A computing device comprising:

a memory containing a machine-readable medium having instructions stored thereon comprising machine executable code; and a processor coupled to the memory, the processor configured to execute the machine executable code to:

receive a request to write data to an object based storage;

determine that the data is to be staged within a transfer data structure before being written to the object based storage, wherein the transfer data structure is in a first storage tier and the object based storage is in a second storage tier;

determine that an amount of storage space used in the transfer data structure exceeds a start throttle threshold;

send, in response to a determination the amount of storage space used exceeds the start throttle threshold, the request into a queue selected from a set of throttling queues;

process the request in the queue based on a dynamic throttle rate; and adjust a drain throttle rate at which the data is transferred out of the transfer data structure based on whether the data to be written is first stored in a physical storage in the first storage tier separate from the transfer data structure.

12. The computing device of claim 11, wherein the processor is further configured to halt throttling in response to determining that the amount of storage space used in the transfer data structure has fallen below a stop throttle threshold; and process any remaining requests in the set of throttling queues according to a first in, first out (FIFO) order.

13. The computing device of claim 11, wherein the set of throttling queues includes a normal queue and a high priority queue and wherein the normal queue is processed at a slower rate than the high priority queue.

14. The computing device of claim 11, wherein the set of throttling queues includes a normal queue and a high priority queue; wherein a first amount of space within the transfer data structure is designated for processing requests in the normal queue and a second amount of space within the transfer data structure is designated for processing requests in the high priority queue; and wherein the second amount of space is greater than the first amount of space.

15. The computing device of claim 11, wherein the processor is further configured to determine that a source of the data is one of a set of sources designated as being subject to throttling prior to sending the request into the queue selected from the set of throttling queues.

16. The computing device of claim 11, wherein the dynamic throttle rate is identified based on a dynamic drain rate that is computed for the transfer data structure.

17. The computing device of claim 11, wherein processing the request comprises:

processing the request in the queue based on the dynamic throttle rate, a first in, first out (FIFO) order, and a priority type of the queue.

18. A non-transitory machine-readable medium having stored thereon instructions for performing a method comprising machine-executable code which, when executed by at least one machine, causes the at least one machine to:

receive a request to stage data in a transfer data structure in a first storage tier before the data is written to object based storage in a second storage tier;

determine that an amount of storage space used in the transfer data structure exceeds a start throttle threshold;

send, in response to a determination the amount of storage space used exceeds the start throttle threshold, the request into a queue selected from a set of throttling queues;

identify a dynamic throttle rate based on a dynamic drain rate computed for the transfer data structure;

process the request in the queue based on the dynamic throttle rate, a priority type of the queue, and a first in, first out (FIFO) order; and adjust a drain throttle rate at which the data is transferred out of the transfer data structure based on whether the data to be written is first stored in a physical storage in the first storage tier separate from the transfer data structure.

19. The non-transitory machine-readable medium of claim 18, wherein the machine-executable code which, when executed by the at least one machine, further causes the at least one machine to halt throttling in response to determining that the amount of storage space used in the transfer data structure has fallen below a stop throttle threshold; and process any remaining requests in the set of throttling queues according to the FIFO order.

20. The non-transitory machine-readable medium of claim 18, wherein the set of throttling queues includes a normal queue and a high priority queue and wherein the normal queue is processed at a slower rate than the high priority queue.

\*    \*    \*    \*    \*